(12) United States Patent
Moon et al.

(10) Patent No.: US 10,659,400 B2
(45) Date of Patent: May 19, 2020

(54) AUTOMATED POPULATION OF DEEP-LINKED INTERFACES DURING PROGRAMMATICALLY ESTABLISHED CHATBOT SESSIONS

(71) Applicant: The Toronto-Dominion Bank, Toronto (CA)

(72) Inventors: Tae Gyun Moon, North York (CA); Robert Alexander McCarter, Eden (CA); Kheiver Kayode Roberts, North York (CA)

(73) Assignee: The Toronto-Dominion Bank, Toronto (CA)

(*) Notice: Subject to any disclaimer, the term of this patent is extended or adjusted under 35 U.S.C. 154(b) by 39 days.

(21) Appl. No.: 16/153,319

(22) Filed: Oct. 5, 2018

(65) Prior Publication Data

US 2020/0112526 A1    Apr. 9, 2020

(51) Int. Cl.
*H04L 12/58* (2006.01)
*H04L 29/06* (2006.01)
*G06N 20/00* (2019.01)

(52) U.S. Cl.
CPC .......... *H04L 51/02* (2013.01); *G06N 20/00* (2019.01); *H04L 65/1069* (2013.01)

(58) Field of Classification Search
USPC ....................................................... 709/206
See application file for complete search history.

(56) References Cited

U.S. PATENT DOCUMENTS

| | | | |
|---|---|---|---|
| 8,949,377 B2 | 2/2015 | Makar et al. | |
| 9,392,112 B2 | 7/2016 | Vymenets et al. | |
| 9,396,491 B2 | 7/2016 | Isaacson et al. | |
| 9,641,470 B2 | 5/2017 | Smullen et al. | |
| 9,865,260 B1 | 1/2018 | Vuskovic et al. | |
| 2014/0164476 A1 | 6/2014 | Thomson | |
| 2014/0250195 A1* | 9/2014 | Capper | G06N 3/004 709/206 |
| 2015/0161615 A1* | 6/2015 | Balasubramanian | G06Q 30/016 705/7.14 |
| 2016/0241493 A1 | 8/2016 | Sharp et al. | |
| 2017/0310613 A1 | 10/2017 | Lalji et al. | |
| 2017/0357638 A1 | 12/2017 | Schlesinger et al. | |
| 2018/0005216 A1 | 1/2018 | Delaney et al. | |
| 2018/0005218 A1 | 1/2018 | Schneider | |

(Continued)

*Primary Examiner* — Hee Soo Kim
(74) *Attorney, Agent, or Firm* — Duane Morris LLP

(57) ABSTRACT

The disclosed exemplary embodiments include computer-implemented apparatuses and processes that automatically populate deep-linked interfaces based n programmatically established chatbot sessions. For example, an apparatus may determine a candidate parameter value for a first parameter of an exchange of data based on received messaging information and on information characterizing prior exchanges of data between a device and the apparatus. The apparatus may also generate interface data that associates the first candidate parameter value with a corresponding interface element of a first digital interface, and may store the store interface data within a data repository. In some instances, the apparatus may transmit linking data associated with the stored interface data to the device, and an application program executed by the device may present a representation of the linking data within a second digital interface.

20 Claims, 14 Drawing Sheets

(56) References Cited

U.S. PATENT DOCUMENTS

2018/0068365 A1* 3/2018 Purves ............... G06Q 30/0619
2018/0101789 A1   4/2018 Soma et al.
2019/0034828 A1* 1/2019 Cagadas ................ G06N 20/00
2019/0140986 A1* 5/2019 Anderson ............... G10L 15/22
2019/0149489 A1* 5/2019 Akbulut ................ G06N 5/022
                                                        709/206

* cited by examiner

AUTOMATED POPULATION OF DEEP-LINKED INTERFACES DURING PROGRAMMATICALLY ESTABLISHED CHATBOT SESSIONS

TECHNICAL FIELD

The disclosed embodiments generally relate to computer-implemented systems and processes that automatically populate deep-linked interfaces during programmatically established chatbot sessions.

BACKGROUND

Today, many financial institutions, online retailers, and other business use chatbots to increase and improve a level of customer engagement within corresponding digital platforms, such as, but not limited to, websites, messaging applications, and mobile applications. In many instances, these existing chatbots can receive a message from a customer's device (e.g., provided as input to a corresponding chat interface), can programmatically generate responses to these received messages, and generate and transmit, to the customer's device, a response to the received message for presentation within a corresponding digital interface.

SUMMARY

In some examples, an apparatus includes a communications unit, a storage unit storing instructions, and at least one processor coupled to the communications unit and the storage unit. The at least one processor is configured to execute the instructions to receive, via the communications unit, a first signal from a device that includes messaging information, and determine a candidate parameter value for a first parameter of an exchange of data based on the messaging information and on information characterizing prior exchanges of data between the device and the apparatus. The at least one processor is further configured to generate interface data based on the first candidate parameter value and store the interface data within the storage unit. The generated interface data associates the first candidate parameter value with a corresponding interface element of a first digital interface, and the at least one processor is further configured to generate and transmit, via the communications unit, a second signal to the device. The second signal includes linking data associated with the stored interface data, and the second signal includes information that causes an application program executed by the device to present a representation of the linking data within a second digital interface.

In other examples, a computer-implemented method includes receiving, using at least one processor, a first signal from a device that includes messaging information, and determining, using the at least one processor, a candidate parameter value for a first parameter of an exchange of data based on the messaging information and information characterizing prior exchanges of data between the device and a computing system. Using the at least one processor, the method generates interface data based on the first candidate parameter value and storing the interface data within a storage unit. The generated interface data associates the first candidate parameter value with a corresponding interface element of a first digital interface, and the method also includes generating and transmitting, using the at least one processor, a second signal to the device. The second signal includes linking data associated with the stored interface data, and the second signal comprising information that causes an application program executed by the device to present a representation of the linking data within a second digital interface.

Further, in some examples, a devices includes a communications unit, a display unit, a storage unit storing instructions, and at least one processor coupled to the communications unit, the display unit, and the storage unit. The at least one processor is configured to execute the instructions to initiate a communications session with an application program executed by a computing system and generate and transmit a first signal to the computing system via the communications unit. The first signal includes messaging information generated during the communications session, the messaging information being associated with an exchange of data, and the at least one processor is further configured to receive a second signal from the computing system via the communications unit. The second signal includes linking data associated with interface data maintained by the computing system, and the interface data associates a first candidate parameter value of the data exchange with a corresponding interface element of a first digital interface. The at least one processor is also configured to generate and present, via the display unit, a second digital interface that includes a representation of the linking data.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

DETAILED DESCRIPTION

Figure 1:
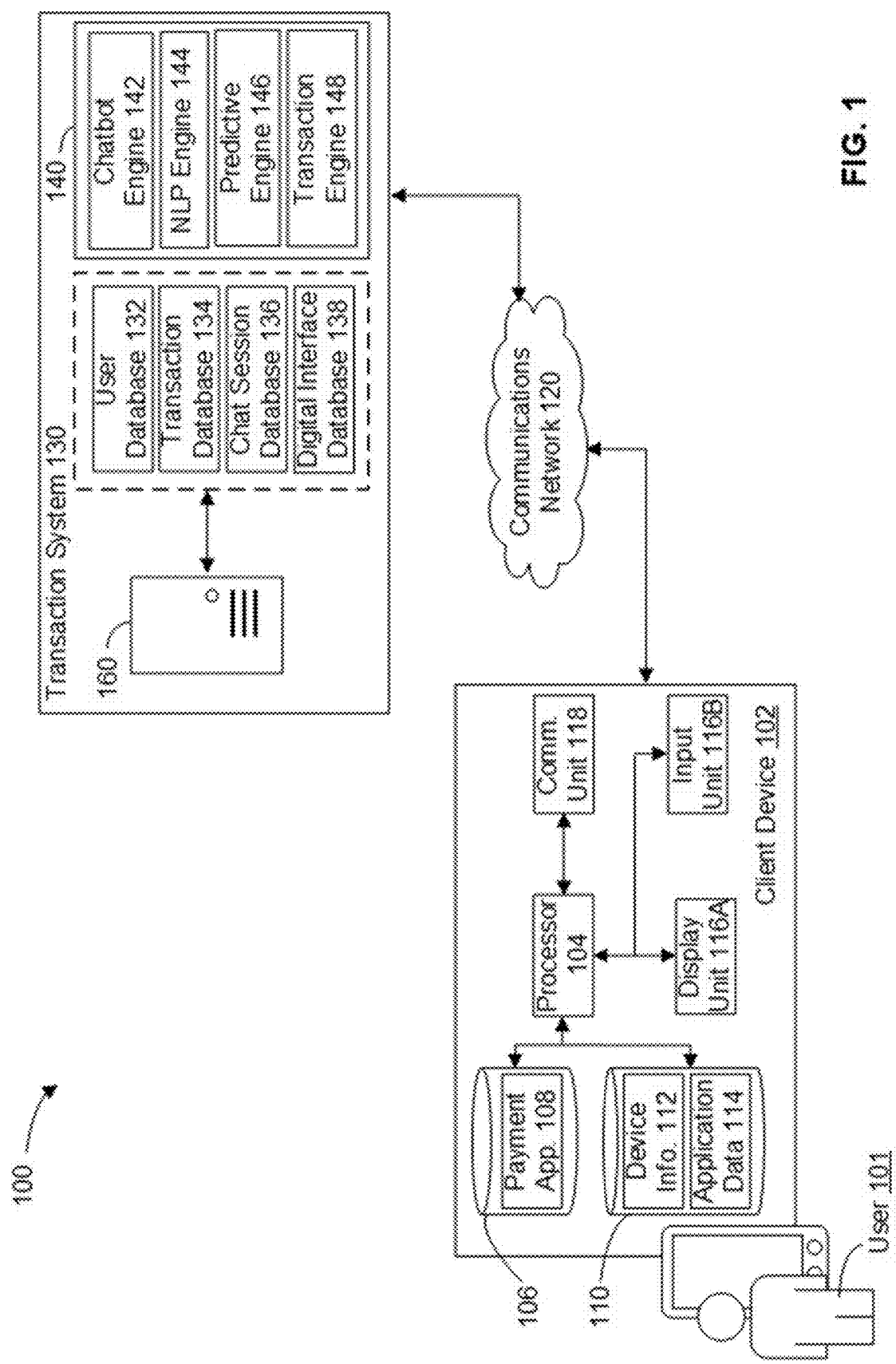
FIG. 1 is a block diagram of an exemplary computing environment, in accordance with some embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

I. Exemplary Computing Environments

FIG. 1 is a diagram illustrating an exemplary computing environment 100 that includes a transaction system 130 and a client device 102, each of which are operatively connected to communications network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. Although not shown, computing environment 100 may include additional devices, such as one or more additional client devices 102, and additional network-connected computing systems, such as one or more transaction systems 130.

In some embodiments, client device 102 may include a computing device having one or more tangible, non-transitory memories that store data and/or software instructions, such as application repository 106, and one or more processors, such as processor 104, configured to execute the software instructions. The one or more tangible, non-transitory memories may, in some examples, store application programs, application modules, and other elements of code executable by the one or more processors. For example, as illustrated in FIG. 1, client device 102 may maintain, within application repository 106, an executable application associated with a financial institution, such as a payment application 108. Payment application 108 may be provisioned to client device 102 by transaction system 130, and in some instances (upon execution), may include perform operations that establish a communications session with an application program executed by transaction system 130 (e.g., a chatbot session with a chatbot associated with a financial institution, as well as chatbot communications during the chatbot session).

Application repository 106 may also include additional executable applications, such as one or more executable web browsers (e.g., Google Chrome™), for example. The disclosed embodiments, however, are not limited to these exemplary application programs, and in other examples, application repository 106 may include any additional or alternate application programs, application modules, or other elements of code executable by client device 102.

Client device 102 may also establish and maintain, within the one or more tangible, non-transitory memories, one or more structured or unstructured data repositories or databases. For example, data repository 110 may include device data 112 and application data 114. Device data 112 may include information that uniquely identifies client device 102, such as a media access control (MAC) address of client device 102 or an Internet Protocol (IP) address assigned to client device 102.

Application data 114 may include information that facilitates, or supports, an execution of any of the application programs described herein, such as, but limited to, supporting information that enables executable payment application 108 to authenticate an identity of a user operating client device 102, such as user 101. Examples of this supporting information include, but are not limited to, one or more alphanumeric login or authentication credentials assigned to user 101, for example, by transaction system 130, or one or more biometric credentials of user 101, such as fingerprint data or a digital image of a portion of user 101's face, or other information facilitating a biometric or multi-factor authentication of user 101. Further, in some instances, application data 114 may include additional information uniquely identifies one or more of the exemplary application programs described herein, such as a cryptogram associated with payment application 108.

Additionally, in some examples, client device 102 may include a display unit 116A configured to present interface elements to user 101, and an input unit 116B configured to receive input from a user of client device 102, such as user 101. For example, user 101 may provide input in response to interface elements presented through display unit 116A. By way of example, display unit 116A may include, but is not limited to, an LCD display unit or other appropriate type of display unit, and input unit 116B may include, but is not limited to, a keypad, keyboard, touchscreen, fingerprint scanner, voice activated control technologies, stylus, or any other appropriate type of input unit.

Further, in some examples, the functionalities of display unit 116A and input unit 116B may be combined into a single device, such as a pressure-sensitive touchscreen display unit that can present interface elements (e.g., graphical user interface) and can detect an input from user 101 via a physical touch. Client device 102 may also include a communications unit 118, such as a wireless transceiver device, coupled to processor 104. Communications unit 118 may be configured by processor 104, and can establish and maintain communications with communications network 120 via a communications protocol, such as WiFi®, Bluetooth®, NFC, a cellular communications protocol (e.g., LTE®, CDMA®, GSM®, etc.), or any other suitable communications protocol.

As described herein, client device 102 may execute a locally maintained application program, such as payment application 108, which may cause client device 102 to generate and render a digital interface for presentation on a corresponding display unit, such as display unit 116A. In some instances, the digital interface may be associated with an exchange of data, such as a data exchange with transaction system 130, capable of initiation by the executed application program. The exchange of data may include one or more discrete interface elements that, when populated by data input to client device 102 by user 101 (e.g., via input unit 116B), specify corresponding parameter values for the digital interface. For example, and without limitation, the digital interface may include a discrete interface element, such as a fillable text box, designated to receive an identifier (e.g., a name) of a counterparty to the data exchange, along with additional or alternate interface elements that are designated to receive other values of parameters, that enable the executed application program to initiate the data exchange.

Examples of client device 102 may include, but are not limited to, a personal computer, a laptop computer, a tablet computer, a notebook computer, a hand-held computer, a personal digital assistant, a portable navigation device, a mobile phone, a smartphone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), and any other type of computing device that may be configured to store data and software instructions, execute software instructions to perform operations, and/or display information on an interface module, consistent with disclosed embodiments. In some instances, user 101 may operate client device 102 and may do so to cause client device 102 to perform one or more operations consistent with the disclosed embodiments.

Referring back to FIG. 1, transaction system 130 may represent a computing system that includes one or more servers 160 and tangible, non-transitory memory devices storing executable code and application modules. Further, the one or more servers 160 may each include one or more processor-based computing devices, which may be configured to execute portions of the stored code or application modules to perform operations consistent with the disclosed embodiments. Additionally, in some instances, transaction system 130 can be incorporated into a single computing system. In other instances, transaction system 130 can be incorporated into multiple computing systems.

For example, transaction system 130 may correspond to a distributed system that includes computing components distributed across one or more networks, such as communications network 120, or other networks, such as those provided or maintained by cloud-service providers (e.g., Google Cloud™, Microsoft Azure™, etc.). In other examples, also described herein, the distributed computing components of transaction system 130 may collectively perform additional, or alternate, operations that establish an artificial neural network capable of, among other things, adaptively and dynamically processing portions of input data to predict values of certain parameters that characterize exchanges of data. The disclosed embodiments are, however, not limited to these exemplary distributed systems, and in other instances, transaction system 130 may include computing components disposed within any additional or alternate number or type of computing systems or across any appropriate network.

By way of example, transaction system 130 may be associated with, or may be operated by, a financial institution that provides financial services to customers, such as, but not limited to user 101, and the financial institution may provide financial services to these customers that include, but are not limited to, an initiation and execution of one or more payment transactions (e.g., a peer-to-peer transaction, a digital bill-payment transaction, etc.) or one or more purchase transactions (e.g., involving digital or physical retailers). Further, and as described herein, transaction system 130 may also be configured to provision one or more executable application programs to network-connected devices operated by these customers, such as, but not limited to, executable payment application 108 provisioned to client device 102.

To facilitate a performance of these and other exemplary processes, such as those described herein, transaction system 130 may maintain, within one or more tangible, non-transitory memories, one or more databases 150. For example, customer database 132 may include data records that identify and characterize one or more users of transaction system 130, e.g., user 101. For example, and for each of the users, the data records of customer database 132 may include a corresponding user identifier (e.g., an alphanumeric login credential assigned to user 101 by transaction system 130), and data that uniquely identifies one or more devices (such as client device 102) associated with or operated by that user 101 (e.g., a unique device identifier, such as an IP address, a MAC address, a mobile telephone number, etc., that identifies client device 102).

Further, the data records of customer database 132 may also link each user identifier (and in some instances, the corresponding unique device identifier) to one or more elements of profile information that characterize corresponding ones of the users of transaction system 130, e.g., user 101. By way of example, the elements of profile information that identify and characterize each of the users of transaction system 130 may include, but are not limited to, a full name of each of the users and contact information associated with each user, such as, but not limited to, a mailing address, a mobile number, or an email address. In other examples, the elements of profile data may also include values of one or more demographic characteristics exhibited by or associated with corresponding ones of the users, such as, but not limited to, an age, a gender, a profession, or a level of education characterizing each of the users of transaction system 130.

Transaction database 134 may include data records that identify and characterize one or more exchanges of data initiated by, or on behalf of, one or more users of transaction system 130 during prior temporal intervals. For example, and for a corresponding one of the initiated data exchanges, the data records of transaction database 134 may include, but are not limited to, a unique identifier of the initiated data exchange, data that identifies the initiating user or device (e.g., the login credential of user 101 or the device identifier of client device 102), an initiation time or date, and values of one or more parameters that characterize the corresponding one of the initiated data exchanges, as described herein. The disclosed embodiments are, however, not limited these examples of identifying and characterizing data, and in other instances, the data records of transaction database 134 may maintain any additional or alternate information appropriate to one or more of the initiated data exchanges.

Chatbot session database 136 may include data records that identify and characterize one or more programmatic exchanges data during chatbot sessions initiated by, or on behalf of, one or more users of transaction system 130. For instance, the data records of chatbot session database 136 may include session data related to one or more previous chatbot sessions established programmatically between an application program executed by client device 102 (e.g., payment application 108, as described herein) and transaction system 130. By way of example, and for a particular one of these previously established chatbot sessions, the data records of chatbot session database 136 may include, but are not limited to, data that identifies a party that initiated or participates in that previously established chatbot session (e.g., a login credential associated with user 101, a device identifier of client device 102, a unique identifier of an executed application program, such as an application cryptogram, etc.), a time or date associated with the previously established chatbot session, or a duration of that established chatbot session.

In other instances, and for the particular one of these previously established chatbot sessions, the data records of chatbot session databases 136 may also include raw or processed information that identifies and characterizes the data exchanged programmatically between client device 102 (e.g., by executed payment application 108) and transaction system 130. By way of example, and as described herein, certain elements of the exchanged data may correspond to a request, by user 101, to initiate one or more exchanges of data involving one or more corresponding counterparties, and the elements of exchanged data may specify values for one or more parameters of these data exchanges. For example, the one or more data exchanges may include, of facilitate, a payment transaction between user 101 and the one or more payees (e.g., a peer-to-peer transfer of funds, a digital bill payment transaction, etc.), and the data records of chatbot session database 136 may specify, for that payment transaction, values of transaction parameters that include, but not limited to, an identifier of a counterparty, a payment amount, an identifier of a source account that funds the payment amount, an identifier of a destination account that received funds, a payment date or time, or a desired currency.

Digital interface database 138 may include data records that identify and characterize one or more digital interfaces that, when populated and provisioned to application programs executed by network-connected devices and systems within environment 100, facilitate an initiation or execution of one or more exchanges of data by transaction system 130. In some instances, the data records of digital interface database 138 may include, for each of the digital interfaces: (i) layout data that identifies one or more discrete interface elements included within each of the digital interfaces (e.g., fillable text boxes, sliding interface elements, etc.) and that specifies a position of the discrete interface elements within corresponding ones of the digital interfaces; and (ii) corresponding elements of information, e.g., metadata, that characterize a type or range of input data associated with each of the discrete interface elements.

By way of example, as described herein, the one or more digital interfaces may include a digital payment interface generated and rendered for presentation on a network-connected device, such as client device 102, by an executed application program, such as executed payment application 108. In some instances, the data records of digital interface database 138 may include elements of layout data that identify one or more discrete interface elements (e.g., fillable text boxes, etc.) included within the digital payment interface and position of these discrete interface elements within the digital payment interface, along with corresponding elements of metadata that identify values (or ranges of values) of transaction parameters associated with each of the discrete interface elements. Examples of these transaction parameters include, but are not limited to, payer profile information, payee profile information (e.g., an identifier of the counterparty), source and destination accounts, and a transaction amount.

Furthermore, transaction system 130 may perform operations that store, within digital interface database 138, interface data received from client device 102, as described herein. Transaction system 130 may also access and extract, from the data records of digital interface database 138, information that facilitates a population and a provisioning of any of the exemplary digital interfaces described herein to application programs executed by corresponding network-connected devices or systems, e.g., populating and provisioning the digital payment interface to executed payment application 108.

Transaction system 130 may also maintain, within the one or more tangible, non-transitory memories, one or more executable application programs 140, such as, but not limited to, a chatbot engine 142, a natural language processing (NLP) engine 144, a predictive engine 146, and a transaction engine 148. When executed by transaction system 130 (e.g., by the one or more processors of transaction system 130), chatbot engine 142 can perform operations that establish an interactive chatbot session with an application program executed by a network-connected device, such as client device 102. For example, chatbot engine 142 may perform, either alone or in combination with NLP engine 144, any of the exemplary processes described herein to process message data received from client device 102 (e.g., based on input provided to a digital interface generated and presented by client device 102), to adaptively and dynamically parse the message data to establish a meaning and/or a context of the message data and further, to generate and provision, to the digital interface, a response to the message data via a secure, programmatic interface. In some instances, when presented to user 101 on the digital interface (e.g., via display unit 116A of client device 102), the presented response may simulate an ongoing and contextually relevant dialog between user 101 and artificially and programmatically generated chatbot.

Further, and when executed by transaction system 130, NLP engine 144 may apply one or more natural language processing algorithms to portions of received message data. Based on the application of these adaptive, statistical, or dynamic natural language processing algorithms, NLP engine 144 may parse the received message data to identify one or more discrete linguistic elements (e.g., a word, a combination of morphemes, a single morpheme, etc.), and to generate contextual information that establishes the meaning or a context of one or more discrete linguistic elements.

Examples of these natural language processing algorithms may include one or more machine learning processes, such as, but not limited to, a clustering algorithm or unsupervised learning algorithm (e.g., a k-means algorithm, a mixture model, a hierarchical clustering algorithm, etc.), a semi-supervised learning algorithm, or a decision-tree algorithm. In other examples, the one or more natural language processing algorithms may also include one or more artificial intelligence models, such as, but not limited to, an artificial neural network model, a recurrent neural network model, a Bayesian network model, or a Markov model. Further, the one or more natural language processing algorithms may also include one or more statistical processes, such as those that make probabilistic decisions based on attaching real-valued weights to elements of certain input data.

Certain of these exemplary statistical processes, machine learning processes, or artificial intelligence models can be trained against, and adaptively improved using, training data having a specified composition, which may be extracted from portions of customer database 132, transaction database 134, and/or a chatbot session database 136, and can be deemed successfully trained and ready for deployment when a model accuracy (e.g., as established based on a comparison with the outcome data), exceeds a threshold value. Further, although chatbot engine 142 and NLP engine 144 are distinctly shown in FIG. 1, in some examples, the functions of NLP engine 144 may be performed by chatbot engine 142 (e.g., NLP engine 144 is part or component of chatbot engine 142).

As described herein, executed predictive engine 146 may perform operations that dynamically and adaptively determine vales of one or more parameters that characterize an exchange of data referenced by, or requested in, a pending chatbot session involving client device 102, e.g., as established by portions of the discrete languishing elements or the contextual information generated by NLP engine 144. In one instance, the requested or reference exchange of data may facilitate an initiation of a payment transaction, by transaction system 130, involving user 101 and one or more counterparties (e.g., peer-to-peer (P2P) transactions, digital bill-payment transactions, etc.), and examples of the parameter values that characterize the payment transaction may include, but are not limited to, an identifier of each of the one or more counterparties, a payment amount, or a payment date or time. The disclosed embodiments are, however, not limited to exchanges of data that facilitate these exemplary payment transactions, and in other instances, the references or requested data exchange may facilitate additional or alternate transactions, such as a purchase transaction involving user 101 and one or more physical or digital retailers.

In some examples, predictive engine 146 may compute one or more of these parameter values based on an application of one or more deterministic or stochastic statistical processes, one or more machine learning processes, or one or more artificial intelligence models to portions of the exemplary customer, transaction, and chatbot session data described herein, e.g., as maintained within customer database 132, transaction database 134, and/or a chatbot session database 136. For example, the deterministic statistical processes can include, but are not limited to, a linear regression model, a nonlinear regression model, a multivariable regression model, and additionally, or alternatively, a linear or nonlinear least-squares approximation.

Examples of the stochastic statistical processes can include, among other things, a support vector machine (SVM) model, a multiple regression algorithm, a least absolute selection shrinkage operator (LASSO) regression algorithm, or a multinomial logistic regression algorithm, and examples of the machine learning processes can include, but are not limited to, an association-rule algorithm (such as an Apriori algorithm, an Eclat algorithm, or an FP-growth algorithm) or a clustering algorithm (such as a hierarchical clustering process, a k-means algorithm, or other statistical clustering algorithms). Further, examples of the artificial intelligence models include, but are not limited to, an artificial neural network model, a recurrent neural network model, a Bayesian network model, or a Markov model, In some instances, these stochastic statistical processes, machine learning algorithms, or artificial intelligence models can be trained against, and adaptively improved using, training data having a specified composition, which may be extracted from portions of customer database 132, transaction database 134, and/or a chatbot session database 136, along with corresponding outcome data, and can be deemed successfully trained and ready for deployment when a model accuracy (e.g., as established based on a comparison with the outcome data), exceeds a threshold value.

Further, when executed by transaction system 130, transaction engine 148 can perform operations to initiate one or more exchanges of data, such as the exemplary payment or purchase transactions described herein, in accordance with one or more received, obtained, or dynamically determined, parameter values. In some instances, and as described herein, transaction engine 148 may perform operations that identify a minimum set of parameter necessary to initiate a corresponding data exchange, e.g., as specified within a corresponding portion of digital interface database 138, and that initiate the one or more data exchanges in accordance with values of the minimum parameter set based on information locally maintained by transaction system 130, or based on additional information exchanges with other network-connected systems or devices, such as those associated with one more payment networks or additional financial institutions.

II. Exemplary Computer-Implemented Processes for Automatically Populating Deep-Linked Interfaces During Established Chatbot Sessions In some embodiments, a network-connected device, such as client device 102, may perform operations that, upon execution of one or more locally maintained application programs, initiate an exchange of data with one or more network-connected devices or systems operating within environment 100, such as, but not limited to, transaction system 130. By way of example, the initiated data exchange may be characterized by values of one or more parameters, and the rendered digital interface may include a plurality of discrete interface elements that correspond to, and facilitate a specification of, each of the one or more parameter values. Based on input provided by a corresponding user, such as user 101, to discrete interface elements presented within the digital interface (e.g., via input unit 116B of client device 102), the executed application program may package all, or a portion of the specified parameters into corresponding elements of request data for transmission to transaction system 130, which may perform operations that initiate the data exchange in accordance with the specified parameter values.

As described herein, the exchange of data may facilitate an initiation of a payment transaction, by transaction system 130, involving user 101 and one or more counterparties. In some instances, these payment transactions include, but are not limited to, peer-to-peer (P2P) transactions that transfer funds between and held by user 101 and one or more counterparties, and digital bill-payment transactions involving a payment of outstanding invoices or obligations. Further, examples of the parameter values that characterize the payment transaction may include, but are not limited to, an identifier of each of the one or more counterparties, an identifier of a source account (e.g., as held by user 101) and one or more destination accounts (e.g., as held by the one or more counterparties), a payment amount, or a payment date or time.

In addition to generating and rendering for presentation digital interfaces that facilitate a specification of parameter values that characterize one or more exchanges of data, such as the exemplary payment transactions described herein, the one or more executed application programs (e.g., executed payment application 108) may also establish and maintain an interactive chat session with an application program executed by transaction system 130, e.g., a chatbot session with executed chatbot engine 142 of FIG. 1. By way of example, executed payment application 108 may generate and present an additional digital interface, e.g., a chatbot interface, on display unit 116A, and user 101 may provide input to client device 102 (e.g., via input unit 116B) that specifies a particular inquiry for resolution through the chatbot session programmatically established and maintained by transaction system 130.

In some instances, transaction system 130 may receive message data characterizing the particular inquiry, such as, but not limited to, a request to initiate any of the exemplary payment transactions described herein. Based on an application of one or more natural language processing algorithms to the received message data, transaction system 130 may perform operations that identify and extract the underlying inquiry, e.g., the request to initiate the payment transactions, from the message data. In some instances, transaction system 130 may perform operations that generate and transmit, to client device 102, a response to the underlying inquiry that conforms to certain established rules and based on data locally maintained by transaction system 130, and examples of the response include, but are not limited to, a hyperlink to a web page that facilitates as specification, by user 101, of one or more values of transaction parameters that characterize the requested payment transaction. As described herein, and when rendered for presented within the chatbot interface, the generated response may simulate an ongoing and contextually relevant dialog between user 101 and artificially and programmatically generated chatbot.

In many instances, while these conventional chatbots and supporting processes may provide functionality that identifies a link to a particular web page associated with the received message, these chatbots often lack functionality that automatically and dynamically performs one or more actions associated with that web page. For example, while transaction system 130 may perform operations identify a request to initiate a payment transaction with a corresponding counterparty, and may provide a hyperlink to a payment web page associated with a digital portal of a financial institution, existing chatbots may be incapable of populating that payment web page, and additional subsequent web pages linked to that payment web page, with parameter values that facilitate an initiation of that requested payment transaction by the user, e.g., based on a single provided input.

Further, these payment web pages and other digital payment interfaces often require a user to provide detailed input, e.g., via input unit 116B of client device 102, to multiple, discrete interface elements disposed across multiple display screens. Although these payment web pages and other digital payment interfaces may be accessible to a user of a network-connected device characterize by full display ad input functionalities, such a laptop computer or a tablet computer, a complexity of these complicated payment web pages and digital payment interfaces may limit an ability of the user to interact properly with these payment web pages and digital payment on mobile or communications device characterized by limited or reduced functionality display or input devices, such as, but not limited to, smart phones having touchscreen display units of limited screen dimension, wearable devices and similar form factors having limited display and input functionalities, and digital assistant devices that characterized by non-textual input mechanisms, e.g., audible input.

In some exemplary embodiments, and as described herein, a network-connected computing system, such as transaction system 130, may perform operations that monitor, in real-time, an interaction of user 101 with a corresponding digital interface, e.g., a chatbot interface generated by executed payment application 108, based on data exchanged with executed payment application 108 across a secure, programmatic interface. For example, transaction system 130 may receive message data from client device 102 (e.g., provided by user 101 as input, via input unit 116B, to the chatbot interface), and based on an application of any of the natural language processing algorithms described herein, transaction system 130 may detect a request to initiate an exchange of data within the received message data, and may determine a value of one or more first parameters that characterize the requested data exchange.

Further, and based on an application of one or more statistical processes, machine learning processes, artificial intelligence models, or other adaptive processes to portions of the first parameter values and to elements of locally maintained customer profile, transaction, and chatbot session data, transaction system 130 may perform any of the exemplary processes described to predict a one or more of second parameters that characterize the requested data exchange. In one instance, the requested data exchange may correspond to any of the exemplary payment transactions described herein, and the values of the first and second parameter may collectively represent a minimum set of parameter values that enables transaction system 130 to execute the payment transaction.

As described herein, transaction system 130 may extract, from a local data repository, such as from digital interface database 138, interface data characterizing a digital interface (e.g., web pages, a digital payment interface, etc.) that facilitate an initiation of the requested data exchange by client device 102, and may perform operations that generate elements of pre-populated interface data linking each of the identified first parameter values and the predicted second parameter values a corresponding interface element of the digital interfaces. Transaction system 130 may further generate a deep link to the locally stored elements of pre-populated interface data, and may further store linking data that identifies and characterizes the generated deep link. Additionally, as described herein, transaction system 130 may generate a response to the received message data that includes the linking data, and may transmit the generated response to the client device 102 across a communications network, such as communications network 120.

Client device 102 may receive the generated response, which includes the linking data specifying the deep link to the pre-populated interface data, and an application program executed by client device 102, e.g., executed payment application 108, may render the generated response, and the deep link, for presentation within the chatbot interface, e.g., on display unit 116A. In response to additional input from user 101 that selects the presented deep link (e.g., via input unit 116B), client device 102 may perform additional operations that, in conjunction with transaction system 130, obtain portions of the pre-populated interface data and present a pre-populated digital interface that facilitates an initiation of the requested data exchange (e.g., any of the payment transactions described herein) in accordance with the identified first parameter values and the predicted second parameters values. In some instances, and as described herein, user 101 may confirm an accuracy of the identified first parameter values and the predicted second parameters values, and initiate the data exchange in accordance with these identified first parameter values and predicted second parameters values based on a provision of a single input to client device 102, e.g., a selection of an additional interface element within the pre-populated digital interface or an utterance of a predetermined word or phrase.

Certain of the exemplary processes described herein, which couple the messaging functionality of a chatbot with processes that pre-populate digital interfaces with data-exchange parameters identified within received chatbot message data, and dynamically predicted in accordance with elements of customer profile data, transaction data, and chatbot session data, can be implemented in addition to, or an as an alternate to, conventional chatbot processes, which in response to message data requesting an initiation of a data exchange, generate and provide to the chatbot interface a hyperlink to an unpopulated web page or other digital interface that includes discrete interface elements disposed across multiple display or interface screens. As described herein, and through the pre-population of these complex digital interfaces within parameters values extracted from the received message data, obtained from customer profile data, or dynamically predicted based on an application of certain statistical processes, machine learning processes, or artificial intelligence processes to selected elements of input data, certain of these exemplary processes enable the user to initiate a corresponding exchange of data by providing a single input to the now-populated digital interface. As such, these exemplary processes, as described herein, may enhance an ability of a user to interact with these complex digital interfaces through communications devices having display units or input units of limited functionality, such as smart phones, wearable devices and form factors, and digital assistants.

Further, and through the dynamic prediction of parameter values based on an application of certain statistical processes, machine learning processes, or artificial intelligence processes to elements of input data that characterize the user's prior interactions with the chatbot session or with transaction system 130, certain of the exemplary processes described herein can improve an accuracy of the dynamically predicted parameter values, which are included within the pre-populated interface data. The improved accuracy of these dynamically predicted parameter values can, in some instances, reduce a number of input operations required to correct or modify the dynamically predicted parameter values within populated into the corresponding digital interface, and can further enhance an ability of the user to interact with these complex digital interfaces using communications devices having reduced- or limited-functionality display units or input units.

In some examples, to initiate a chatbot session with transaction system 130, user 101 may provide input to client device 102 (e.g., via input unit 116B) that requests an execution of a corresponding application program, such as payment application 108 of FIG. 1. For example, upon execution by client device 102, payment application 108 may generate and render one or more interface elements for presentation within a corresponding digital payment interface, such as through display unit 116A. In some examples, the digital payment interface may include interface elements that prompt user 101 to provide, via input unit 116B, input that specifies a corresponding login credential (e.g., an alphanumeric login credential of user 101, etc.) and one or more corresponding authentication credentials (e.g., an alphanumeric password of user 101, a biometric credential of user 101, etc.).

Based on the provided login and authentication credentials, executed payment application 108 may perform operations that authenticate an identity of user 101 based on copies of locally stored login and authentication credentials (e.g., as maintained within corresponding portions of device data 112 and application data 114) or based on data exchanged with one or more network-connected computing systems, such as transaction system 130. Further, an in response to a successful authentication of the identity of user 101, executed payment application 108 may perform operations that package a unique identifier of user 101 (e.g., the login credential), a unique identifier of client device 102 (e.g., an IP or MAC address extracted from device data 112) into corresponding portions of a request to initiate a chatbot session with transaction system 130. In some instances, executed payment application 108 may also package data confirming a successful authentication of the identity of user 101, such as an application cryptogram (e.g., extracted from, or generated in accordance with data maintained in, application data 114) into an additional portion of the request.

Client device 102 may transmit the generated request across network 120 to transaction system 130, e.g., via a secure programmatic interface. The secure programmatic interface may receive the generated request, and may relay the generated request to chatbot engine 142 of transaction system 130, which may perform operations that parse the request and extract the user identifier and the device identifier (and in some instances, the data confirming the successful authentication of the identity of user 101). In some instances, chatbot engine 142 may processes the extracted data (e.g., the user identifier, the device identifier, and/or the confirmation data), and verify an authenticity or an integrity of the received request based on the device identifier or the confirmation data. Based on the verified authenticity or integrity, chatbot engine 142 may perform operations that initiate a chatbot session with executed payment application 108, and that generate an additional data record within chatbot session database 136 that identifies and characterizes the initiated chatbot session.

By way of example, the newly generated data record may include the user identifier and the device identifier (and in some instances, the confirmation data), and may further include a time or date at which chatbot engine 142 initiated the chatbot session. Further, in some instances, chatbot engine 142 may perform operations that generate an initial, introductory message for the chatbot session based on, among other things, one or more predetermined rules that specify appropriate introductory messages, the time or date of initiation, and additionally, or alternatively, the user or device identifiers. For example, the introductory message may include textual content that includes a greeting and that prompts user 101 to further interact with the established chatbot session (e.g., "Good morning! How can we help you?), and chatbot engine 142 may perform operations that generate introductory message data specifying the introductory message, and that transmit the introductory message data across network 120 to client device 102, e.g., through a secure programmatic interface. Chatbot engine 142 may also perform operations that store the introductory message data within the newly generated data record that identifies the chatbot session within chatbot session database 136, and that associate the message data with the user identifier, the device identifier, and additionally, or alternatively, the confirmation data.

In some instances, client device 102 may receive the message data via the secure programmatic interface, which may route the introductory message data to executed payment application 108. In response to the receipt of the introductory message data, executed payment application may generate and render for presentation an additional digital interface, e.g., a chatbot interface, that includes the introductory message data and facilitates an ongoing and simulated conversation between user 101 and a programmatically generated chatbot maintained by transaction system 130, as described below in FIG. 2A.

Figures 2A, 2B:
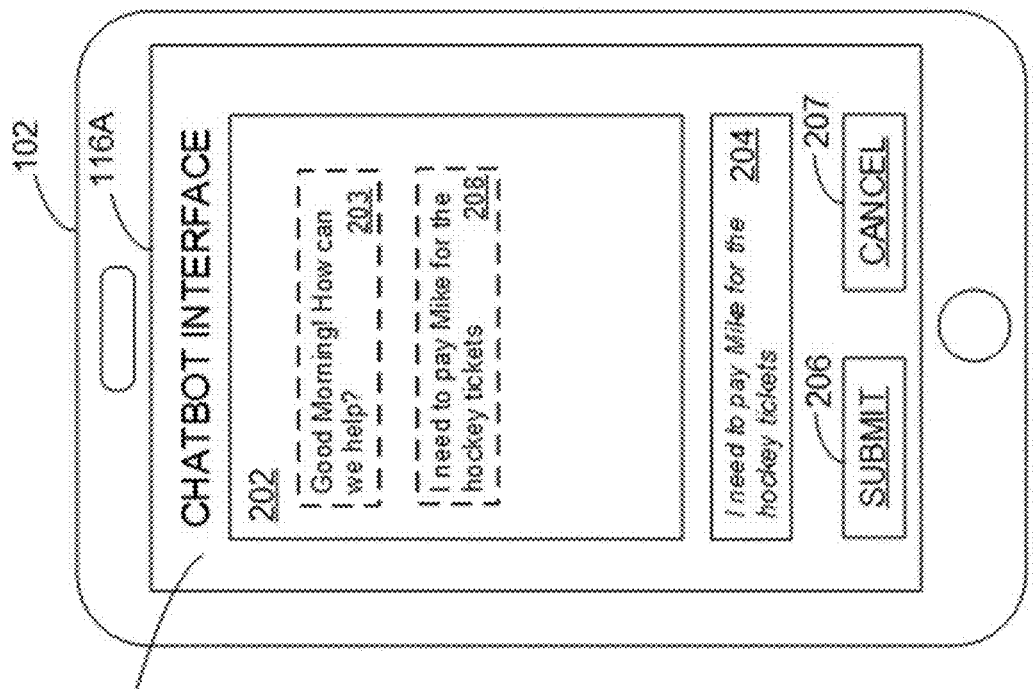
FIGS. 2A and 2B are diagrams illustrating portions of an exemplary graphical user interface, in accordance with some embodiments.

Referring to FIG. 2A, client device 102 may present chatbot interface 200 on a corresponding portion of display unit 116A. In some instances, chatbot interface 200 may include a chatbot session area 202, which displays a summary of a current chatbot session, and fillable text box 204 allows user 101 to provide input that, after selection of icon 206 (e.g., via input unit 116B), will be shown in chatbot session area 202. In some instances, executed payment application 108 may perform operations that present all or a portion of the introductory message data for presentation within chatbot interface 200, and as illustrated in FIG. 2A, chatbot session area 202 may include introductory message 203 (e.g., "Good Morning! How can we help?). The automatic presentation of introductory message 203 may simulate a conversation between user 101 and the programmatic chatbot maintained by transaction system 130, and as illustrated in FIG. 2A, introductory message greet user 101 and prompts user 101 to further interact with the established chatbot session.

In some instances, user 101 may plan to initiate an exchange of data with transaction system 130 that facilitates a peer-to-peer (P2P) transaction with a counterparty, e.g., a payment for user 101's monthly share of season tickets for the Washington Capitals™. To initiate the data exchange (and the P2P transaction), user 101 may provide additional input to fillable text box of chatbot interface 200, e.g., via input unit 116B of client device 102, that requests an initiation of the data exchange and the P2P transaction. For example, display unit 116A may correspond to a pressure-sensitive, touchscreen display unit, and user 101 may provide input to fillable text box 204, e.g., via a miniaturized "virtual" keyboard presented within digital chatbot interface 200, that specifies message 208, e.g., "I need to pay Mike for the hockey tickets."

In other instances, the input to fillable text box 204 may include audio content representative of a spoken utterance of message 208, which may be captured by a corresponding microphone embedded into client device 102 (e.g., as a portion of input unit 116B) or in communication with client device 102 (e.g., across a short-range communications channel, such as Bluetooth™, etc.). Executed payment application 108 may receive the audio content and, based on an application of one or more speech recognition algorithms or natural-language processes algorithms to the audio content, convert the audio content into text corresponding to message 208.

Referring to FIG. 2B, executed payment application 108 may process the input, and may present message 208 within a corresponding portion of fillable text box 204. Further, user 101 may provide additional input to client device 102 that requests a submission of message 208 to the established chatbot session by selecting "Submit" icon 206 (e.g., by establishing contact between a portion of a finger or a stylus and a corresponding portion of a surface of display unit 116A that corresponding to icon 206, or by uttering one or more predetermined phrases associated with icon 206, which may be captured by any of the exemplary microphones described herein). Executed payment application 108 may detect the provided additional input, which requests the submission of message 208 to the established chatbot session, and may perform operations that present all or a portion of message 208 within chatbot session area 202. In other instances, user 101 may provide input to input unit 1166 that selects "Cancel" icon 207, the detection of which causes executed payment application 108 to clear any text currently in fillable text box 204 and prevent a submission of message 208.

In response to the additional user input that selects "Submit" icon 206, executed payment application 108 may perform operations that package all or a portion of message 208 into corresponding portions of session data, along with the unique identifier of user 101 (e.g., the alphanumeric login credential) and additionally, or alternatively, the unique device identifier (e.g., the IP or MAC address of client device 102 maintained within device data 112). Further, and as described herein, executed payment application 108 may also include, within a portion of the received message data, an application cryptogram that identifies executed payment application 108, e.g., as extracted from application data 114.

Executed payment application 108 may perform operations that cause client device 102 to transmit all or a portion of the generated session data across network 120 to transaction system 130, e.g., using any appropriate communications protocol. In some examples, transaction system 130 may perform any of the exemplary processes described herein to detect, within the session data, the request to initiate the data exchange, to compute dynamically a predicted value of one or more parameters that characterize the requested exchange of data, and to provision, to client device 102 within the established chatbot session, a deep-link to a pre-populated digital interface (e.g., a web page, a screen of a digital interface, etc.) that facilitates an initiation of the requested data exchange in accordance with the dynamically predicted parameter values.

Figure 3A:
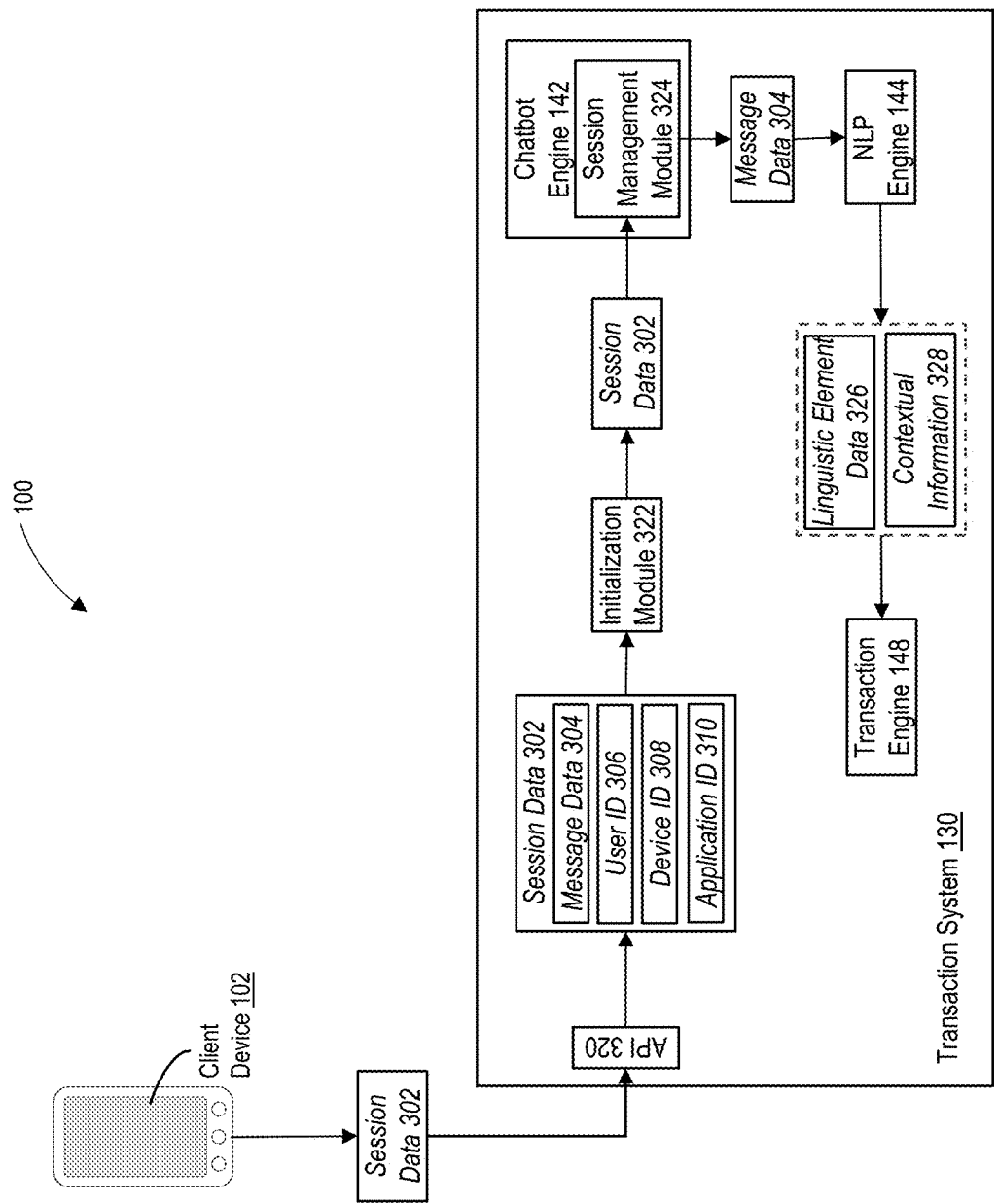
FIGS. 3A, 3B, and 3C are diagrams illustrating portions of an exemplary computing environment, in accordance with some embodiments.

Referring to FIG. 3A, a secure programmatic interface of transaction system 130, e.g., application programming interface (API) 320, may receive and route session data 302 to a initialization module 322 executed by transaction system 130. In some instances, and as described herein, session data 302 may include message data 304, which represents message 208 provided by user 101 as an input to chatbot interface 200 of FIG. 2B (e.g., "I need to pay Mike for the hockey tickets"), along with an identifier 306 of user 101 (e.g., an alphanumeric login credential, etc.), an identifier 308 of client device 102 (e.g., an IP or MAC address, etc.). Further, session data 302 may also include a unique identifier of executed payment application 108 (e.g., an application cryptogram) that, in some instances, may enable transaction system 130 to verify an authenticity or an integrity of session data 302.

In some instances, API 320 may be associated with or established by initialization module 322, and may facilitate secure, module-to-module communications across network 120 between initialization module 322 and client device 102 (e.g., via communications unit 118). Initialization module 322 may parse session data 302 to extract one or more of user identifier 306, device identifier 308, or application identifier 310, and may perform operations (not illustrated in FIG. 3A) that verify an authenticity or an integrity of session data 302. In response to successful verification, initialization module 322 may perform operations that store session data 302 within one or more tangible, non-transitory memories, and may that provide session data 302 as an input to chatbot engine 142, which, when executed by transaction system 130, can maintain a chatbot session with, for example, client device 102. In other examples (not illustrated in FIG. 3A), in response to an unsuccessful verification, initialization module 322 may perform operations that generate and transmit, across network 120 to client device 102, an error message indicative of the failed verification, and that discard session data 302.

Referring back to FIG. 3A, a session management module 324 of chatbot engine 142 may receive session data 302, and may parse session data 302 to extract message data 304 (e.g., representative of provided input "I need to pay Mike for the hockey tickets"). In some instances, session management module 324 may perform operations that generate a programmatic command that executes NLP engine 144, e.g., as provided through a corresponding programmatic interface, and that provides all or a portion of message data 304 as an input to executed NLP engine 144.

NLP engine 144 may receive message data 304, and may apply any of the exemplary natural language processing algorithms described herein to all or a portion of message data 304. Based on the application of these natural language processing algorithms, NLP engine 144 may identify one or more discrete linguistic elements (e.g., a word, a combination of morphemes, a single morpheme, etc.) within message data 304, and may establish a context and a meaning of combinations of the discrete linguistic elements, e.g., based on the identified discrete linguistic elements, relationships between these discrete linguistic elements, and relative positions of these discrete linguistic elements within message data 304. In some instances, NLP engine 144 may generate linguistic element data 326, which includes each discrete linguistic elements, and contextual information 328 that specifies the established context or meaning of the combination of the discrete linguistic elements.

As described herein, examples of these natural language processing algorithms may include one or more machine learning processes, such as, but not limited to, a clustering algorithm or unsupervised learning algorithm (e.g., a k-means algorithm, a mixture model, a hierarchical clustering algorithm, etc.), a semi-supervised learning algorithm, or a decision-tree algorithm. In other examples, the one or more natural language processing algorithms may also include one or more artificial intelligence models, such as, but not limited to, an artificial neural network model, a recurrent neural network model, a Bayesian network model, or a Markov model. Further, the one or more natural language processing algorithms may also include one or more statistical processes, such as those that make probabilistic decisions based on attaching real-valued weights to elements of certain input data.

Further, and in some instances, message data 304 may be representative of message 208 provided by user 101 as an input to chatbot interface 200 of FIG. 2, e.g., "I need to pay Mike for the hockey tickets." Based on the application of the exemplary natural language processing algorithms described herein to message data 304, NLP engine 144 may parse message data 304 and extract discrete linguistic elements 326 (e.g., discrete words) that include, but are not limited to, "I," "need," "to," "Mike," "for," "the," "hockey," and "tickets," each of which may be packaged into a corresponding portion of linguistic element data 326. Further, and based on any of these exemplary natural language processing algorithms described herein to the discrete linguistic elements, e.g., alone or in combination, NLP engine 144 may determine that message 208 corresponds to a request to initiate an exchange of data (e.g., a peer-to-peer (P2P) transaction involving user 101 and "Mike"), and that message 208 specifies at least an incomplete portion of one or more parameter values that characterize the data exchange (e.g., a portion of an identifier of a counterparty to the P2P transaction (e.g., "Mike") and data characterizing a product or service associated with the P2P transaction (e.g., the "hockey tickets").

In some instances, NLP engine 144 may package data identifying a particular type of the data exchange (e.g., the P2P transaction described herein) and data identifying the completely, or incompletely, specified ones of the parameter values of the data exchange (e.g., the portion of the counterparty identifier (e.g., "Mike") and the data characterizing the product or service (e.g., the "hockey tickets") into corresponding portions of contextual information 328. Further, NLP engine 144 may provide linguistic element data 326 and contextual information 328 as inputs to transaction engine 148 that, when executed by transaction system 130, performs any of the exemplary processes described herein to determine whether contextual information 328 includes parameter values sufficient to initiate and execute the corresponding type of data exchange, and if not, to dynamically predict values of one of more additional data-exchange parameters that, when combined within the parameter values within contextual information 328, facilitate an initiation and execute of the corresponding type of data exchange by transaction system 130.

Figure 3B:
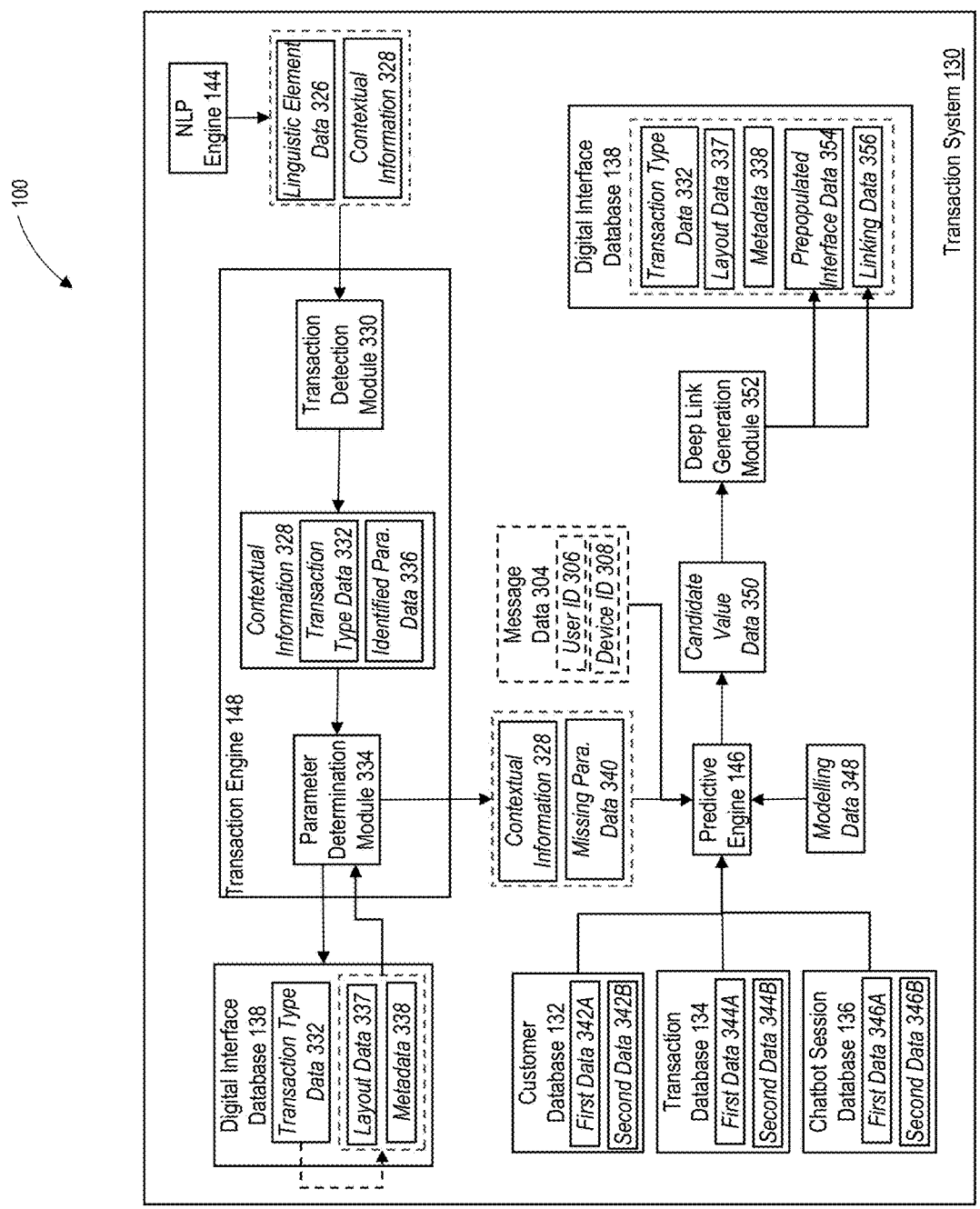

Referring to FIG. 3B, transaction engine 148 may receive linguistic element data 326 and contextual information 328, e.g., as outputs from NLP engine 144, and route linguistic element data 326 and contextual information 328 to a transaction detection module 330 of transaction engine 148. In some instances, transaction detection module 330 may perform operations that store linguistic element data 326 and contextual information 328 within corresponding portions of one or more tangible, non-transitory memories (not illustrated in FIG. 3B). Further, transaction detection module 330 may also parse contextual information 328 to extract transaction type data 332 characterizing a particular type of data exchange associated with message data 304, e.g., a P2P transaction associated with the "I need to pay Mike for the hockey tickets."

In some instances, transaction detection module 330 may determine that transaction system 130 is capable of initiating or executing the particular type of data exchange, e.g., the P2P transaction, and based on the determination, transaction detection module 330 may provide contextual information 328 (which includes transaction type data 332) as an input to a parameter determination module 334 of transaction engine 148. In other instances, should transaction detection module 330 determine that transaction system 130 is incapable of initiating or executing the particular type of data exchange associated with message data 304, transaction detection module 330 may generate and error message indicative of the determined incapability and provide that error message to chatbot engine 142 (not illustrated in FIG. 3B) which may perform additional operations that provision, within the established chatbot session, additional messages to client device 102 that prompt user 101 to contact one or more additional resources capable of servicing the particular type of data exchange (also not illustrated in FIG. 3B).

Referring back to FIG. 3B, parameter determination module 334 may receive contextual information 328, and may perform operations that parse contextual information 328 to extract transaction type data 332 and identified parameter data 336, which includes each of the complete or incomplete parameter values identified by NLP engine 144 within message data 304. In some instances, parameter determination module 334 may perform operations that access the data records of digital interface database 138, and identify and obtain one or more elements of layout data 337 and metadata 338 that include, or reference, transaction type data 332 and as such, characterize a digital interface associated with the particular type of data exchange specified within transaction type data 332, e.g., the P2P transaction.

In some instances, layout data 337 may include information that identifies one or more discrete interface elements disposed within the corresponding digital interface associated with the P2P transaction and further, that that specifies a position of each of the discrete interface elements within the corresponding the digital interface, e.g., when rendered for presentation. Further, and as described herein, metadata 338 may identify and characterize a parameter value associated with each of the discrete interface elements disposed within the corresponding digital interface, and in some instances, the identified and characterized parameter values may collectively establish a minimum set of parameter values that facilitate an initiation and an execution of the particular type of data exchange specified within transaction type data 332.

In some examples, parameter determination module 334 may perform operations that compare the complete or incomplete parameter values specified within identified parameter data 336 against the minimum set of parameter values necessary to initiate and execute the particular type of data exchange, e.g., as specified within metadata 338 for the P2P transaction. For instance, and as described herein, identified parameter data 336 may specify, for the P2P transaction, the incomplete portion of the counterparty identifier (e.g., "Mike") and the data characterizing the associated product or service (e.g., the "hockey tickets").

Further, in some instances, metadata 338 may specify, for the P2P transaction, a minimum set of parameter values that include, but are not limited to, an identifier of a counterparty to the P2P transaction, an identifier of a source account (e.g., that funds the P2P transaction), an identifier of a destination account (e.g., that receives funds transferred to the counterparty in the P2P transaction), a transaction amount, and a transaction data and time. The disclosed embodiments are, however, not limited to these exemplary parameter values, and in other instances, the minimum set of parameter values for the P2P transaction, or for any other appropriate transaction or data exchange, may include any additional, or alternate, parameter values that enable transaction system 130 to initiate or execute the transaction or data exchange, such as an involved product or service or a currency that denominates the transaction.

Based on comparison of identified parameter data 336 and metadata 338, the parameter determination module 334 may establish that identified parameter data 336 fails to include one or more of the minimum set of parameter values necessary to initiate and execute the particular type of data exchange, e.g., the P2P transaction. For example, parameter determination module 335 may determine that identified parameter data 336 fails to specify, among other things, the proper counterparty identifier (e.g., beyond the extracted first name "Mike"), the identifiers of the source and destination accounts, and the transaction amount, date, and time.

In some instances, parameter determination module 334 may package data identifying each of these missing parameter values within corresponding portions of missing parameter data 340 (e.g., the counterparty identifier, the identifiers of the source and destination accounts, and the transaction amount, date, and time). As illustrated in FIG. 3B, the parameter determination module 334 may provide contextual information 328 (e.g., including transaction type data 332 and identified parameter data 336) and missing parameter data 340 as input to the predictive engine 146, which, upon execution by transaction system 130, may perform any of the exemplary processes described herein to predict candidate values for each of the missing parameter values that consistent with data characterizing user 101, one or more prior exchanges of data involving user 101 or client device 102, and one or more prior chatbot sessions involving user 101.

In some instances, predictive engine 146 may receive contextual information 328 and missing parameter data 340, e.g., as output by parameter determination module 334. Further, as illustrated in FIG. 3B, predictive engine 146 may also access message data 304, e.g., as locally maintained within the one or more tangible, non-transitory memories, and extract user identifier 306, which identifies user 101 (e.g., the alphanumeric login credential of user 101) and additionally, or alternatively, device identifier 308, which identifies client device 102 (e.g., the IP or MAC address of client device 102). Based on the extracted user identifier 306 or extracted device identifier 308, predictive engine 146 may access customer database 132, and obtain first user data 342A, which characterizes user 101, and second user data 342B, which characterizes one or more additional users associated with transaction system 130 (e.g., additional customers of the financial institution that operates transaction system 130).

By way of example, first user data 342A and second user data 342B may include account data that identifies one or more financial services accounts issued by the financial institution associated with transaction system 130, or by other financial institutions, and held by respective ones of user 101 and the additional users of transaction system 130. For instance, the account data may include, but is not limited to, an actual or tokenized account number, a routing number (e.g., for deposit accounts), a verification code or expiration date (e.g., for credit card accounts), and data indicative of an account status, such as, but not limited to, an account balance, etc. In further examples, first user data 342A and second user data 342B may also include profile data that characterizes respective ones of user 101 and the additional user of transaction system 130, and examples of the profile data include, but are not limited to, one or more demographic parameters characterizing respective ones of user 101 and the additional users and certain data-exchange preferences established by respective ones of user 101 and the additional users. The data-exchange parameters may, in some instances, identify a preference of user 101, or of one or more of the additional users, that a certain account or subset of accounts should function as source or destination accounts in any exemplary data exchanges described herein, such as the P2P payment transaction.

Further, and based on extracted user identifier 306 or extracted device identifier 308, predictive engine 146 may also access transaction database 134, and obtain first transaction data 344A, which characterizes prior exchanges of data involving user 101, and second transaction data 344B, which characterizes prior exchanges of data involving the additional users associated with transaction system 130. Additionally, based on extracted user identifier 306 or extracted device identifier 308, predictive engine 146 may also access chatbot session database 136, and obtain first chatbot session data 346A, which characterizes prior chatbot sessions involving user 101, and second chatbot session data 346B, which characterizes prior chatbot sessions involving the additional users of transaction system 130.

By way of example, first and second transaction data 344A and 344B may include values of parameters that characterize prior data exchanges involving respective ones of user 101 and the additional users. In some instances, the prior data exchanges may facilitate an initiation or execution of any of the exemplary transactions described herein, which include, but are not limited to, peer-to-peer (P2P) transactions, bill-payment transactions, or purchase transactions, and first and second transaction data 344A and 344B may specify, for each of these transactions, an identifier of respective ones of the user 101 and the additional users (e.g., user identifier 306, etc.), an identifier of a corresponding counterparty, a transaction amount, a transaction date and time, and/or a product or service involved in the transaction.

Further, one or more of the prior data exchanges (e.g., the payment or purchase transactions described herein) may be associated with, or initiated on a basis of, data exchanged between client device 102 and transaction system 130 during a previously established chatbot session. In some instances, a portion of first transaction data 344A that identifies and characterizes each of these prior data exchanges may also include data that identifies the previously established chatbot session, such as, but not limited to, a unique identifier of the previously established chatbot session or a pointer to a corresponding one of the data records of chatbot session database 136 (e.g., as maintained within the one or more locally accessible memories).

Additionally, in some examples, first and second chatbot session data 346A and 346B may include values of parameters that characterize prior chatbot sessions involving respective ones of user 101 and the additional users, and established programmatically between application programs executed by transaction system 130 (e.g., chatbot engine 142) and network-connected devices or systems associated with respective ones of user 101 or the additional users (e.g., payment application 108 executed by client device 102). In some instances, and for a particular one or more of the chatbot sessions involving user 101 and client device 102, first chatbot session data 346A may include, but is not limited to a unique session identifier (e.g., an alphanumerical character string having a specified format), data that identifies user 101 (e.g., user identifier 306), data that identifies client device 102 (e.g., device identifier 308, application identifier 310, etc.), a time or date associated with the previously established chatbot session, a duration of that established chatbot session, and/or a session log that includes raw or processed information that identifies and characterizes each of the messages exchanged programmatically between client device 102 (e.g., by executed payment application 108) and transaction system 130.

In some instances, predictive engine 146 may perform operations that obtain first and second user data 342A and 342B, first and second transaction data 344A and 344B, and first and second chatbot session data 346A and 346B from data repositories locally maintained by transaction system 130, e.g., customer database 132, transaction database 134, and chatbot session database 136. In other instances, and consistent with the disclosed embodiments, predictive engine 146 may obtain all or a portion of first and second user data 342A and 342B, first and second transaction data 344A and 344B, and first and second chatbot session data 346A and 346B from one or more additional network-connected systems, e.g., across network 120 via secure programmatic interfaces. For instance, these additional network-connected systems may establish, or represent components of, a distributed network provided or maintained by any of the exemplary cloud-service providers described herein.

Referring back to FIG. 3B, predictive engine 146 may also parse missing parameter data 340 to extract elements of data that characterize respective ones of the parameter values that are both necessary to initiate and execute the particular type of data exchange, e.g., the P2P transaction described herein, and that are missing from (or incompletely specified within) identified parameter data 336. For example, and as described herein, these missing parameter values include the proper counterparty identifier, the identifiers of the source and destination accounts, and the transaction amount, date, and time for the P2P transaction.

In some examples, predictive engine 146 may perform any of the exemplary processes described herein to determine or predict candidate parameter value for each of these missing parameter values based on selected portions of first and second user data 342A and 342B, first and second transaction data 344A and 344B, and first and second chatbot session data 346A and 346B. For instance, predictive engine 146 may access profile data characterizing user 101, e.g., within first user data 342A, obtain an identifier of default account held by user 101 and capable of funding the P2P transaction (e.g., an actual or tokenized account number of a deposit account held by user 101), and establish the default account identifier as a candidate identifier of the source account involved in the P2P transaction.

In other instances, and without limitation, predictive engine 146 may obtain, from the accessed profile data characterizing user 101, an identifier of a default counterparty specified by user 101 for the P2P transaction (e.g., a unique identifier or a full name of "Mike," as specified within message data 304). Further, and based on the default counterparty identifier, predictive engine 146 may parse second user data 342B and extract, for corresponding portions of account data, an identifier of a financial services account held by one of the additional users associated with the default counterparty identifier. In some examples, predictive engine 146 may establish the default counterparty identifier as the candidate identifier of the counterparty involved in the P2P transaction, and may establish the extracted account identifier as a candidate identifier of the destination account involved in the P2P transaction.

Additionally, or alternatively, predictive engine 146 may also perform operations that, for one or more of the missing parameter values, predict a corresponding candidate parameter value based on an application of one or predictive models to model input data selectively extracted or derived from portions of identified parameter data 336, first and second user data 342A and 342B, first and second transaction data 344A and 344B, and first and second chatbot session data 346A and 346B. In other instances, the model input data may also include additional or alternate information, such as, but not limited to, data that characterizes a historical (or a current) interaction between user 101 and the financial institution that operates user 101, other financial institutions (e.g., the collective operate a payment rail in conjunction with the financial institution), and other chatbots via application programs associated with the other financial institutions or other business entities (e.g., a chatbot interface generated by an application program associated with a retailer, a utility, or other entity).

By way of example, and as described herein, each of the predictive models may be based on one, or more, of a deterministic or stochastic statistical process, a machine learning processes, or an artificial intelligence model. For example, the deterministic statistical process can include, but is not limited to, a linear regression model, a nonlinear regression model, a multivariable regression model, and additionally, or alternatively, a linear or nonlinear least-squares approximation.

Examples of the stochastic statistical process can include, among other things, a support vector machine (SVM) model, a multiple regression algorithm, a least absolute selection shrinkage operator (LASSO) regression algorithm, or a multinomial logistic regression algorithm, and examples of the machine learning process can include, but are not limited to, an association-rule algorithm (such as an Apriori algorithm, an Eclat algorithm, or an FP-growth algorithm) or a clustering algorithm (such as a hierarchical clustering process, a k-means algorithm, or other statistical clustering algorithms). Further, examples of the artificial intelligence models include, but are not limited to, an artificial neural network model, a recurrent neural network model, a Bayesian network model, or a Markov model. As described herein, these stochastic statistical processes, machine learning processes, or artificial intelligence models can be trained against, and adaptively improved using, training data having a specified composition and corresponding outcome data, and can be deemed successfully trained and ready for deployment when a model accuracy (e.g., as established based on a comparison with the outcome data), exceeds a threshold value.

As illustrated in FIG. 3B, predictive engine 146 may obtain modelling data 348 (e.g., from one or more tangible, non-transitory memories) that specifies a composition and/or a structure of discrete elements of input data associated with each of the predictive models, as such, corresponding ones of the deterministic or stochastic statistical processes, machine learning processes, or artificial intelligence models. In some examples, the structure or composition of one or more of the discrete elements of input data may be model specific (e.g., tailored to a specific compositional requirement of the deterministic or stochastic statistical processes, machine learning processes, or artificial intelligence models described herein). Additionally, or alternatively, the composition of structure of one or more of the discrete elements of input data may be specific to a particular type of data exchange (e.g., the P2P transaction described herein, etc.), or specific to a particular user or customer of the financial institution associated with transaction system 130.

In some examples, and based on portions of modelling data 348, predictive engine 146 may generate the discrete elements of input data based on a selective extraction and subsequent processing of certain portions of identified parameter data 336, first and second user data 342A and 342B, first and second transaction data 344A and 344B, and first and second chatbot session data 346A and 346B (e.g., as specified within modelling data 348). Predictive engine 146 may apply the one or more predictive models (e.g., one of more of the deterministic or stochastic statistical processes, machine learning processes, or artificial intelligence models) to each of the discrete elements of input data, and based on the application of the one or more provide models to the discrete elements of input data, predictive engine 146 may determine a candidate parameter value for some, or all, of the missing or incompletely specified parameters values identified within missing parameter data 340.

For instance, and for the P2P transaction identified by transaction detection module 330, modelling data 348 may specify elements of input data include, but are not limited to, the incompletely specified counterparty identifier (e.g., "Mike," as predicted by NLP engine 142), the data characterizing the product or service involved in the P2P transaction (e.g., the hockey tickets, as predicted by NLP engine 142), portions of the account and profile data associated with and characterizing user 101 (e.g., included within first user data 342A), portions of the data characterizing prior transactions involving user 101 and other users of transaction system 130 (e.g., as specified within first and second transaction data 344A and 344B), initiation times or dates and session logs characterizing prior chatbot sessions involving user 101 or client device 102 (e.g., as maintained within first chatbot session data 346A). The disclosed embodiments are, however, not limited to these exemplary elements of input data, and in other instances, modelling data 348 may specify any additional or alternate elements of input data that would be appropriate to the one or more predictive models, to the P2P transaction, and to user 101.

In some instances, predictive engine 146 may perform operations that structure the discrete elements of input data in accordance with portions of modelling data 348, and may apply the one or more predictive models (e.g., the deterministic or stochastic statistical processes, machine learning processes, or artificial intelligence models described herein) to the structured elements of input data. Based on the application of the one or more predictive models to the discrete elements of input data, predictive engine 146 may perform operations that determine, or predict, candidate parameter values for all or some of the missing parameters values specified within missing parameter data 340. By way of example, and for the exemplary P2P transaction described herein, predictive engine 146 may perform any of the exemplary processes describe herein to predict that the incompletely specific counterparty identifier, e.g., "Mike," refers to a counterparty "Michael Jones" associated with a corresponding user identifier. In some instances, predictive engine 146 may establish the counterparty name (e.g., "Michael Jones") and the corresponding user identifier as candidate values for the counterparty identifier.

In other examples, and based on the application of the one or more predictive models to the specified product identifier (e.g., the hockey tickets) and to portions of first transaction data 344A and first chatbot session data 346A, predictive engine 146 may dynamically identify a correlation between a timing of (i) chatbot sessions having messages referencing payments to "Mike" for hockey tickets and (ii) a monthly initiation of a P2P transaction (e.g., on the fifteen day of each month) transferring funds in the amount of $500 from an account held by user 101 to an additional account held by "Michael Jones." In accordance with the identified correlation, predictive engine 146 may perform operations that establish $500 as a candidate parameter value for the missing transaction amount, and may establish October $15^{th}$ as a candidate parameter value for the missing transaction data. Further, and based on the identified correlation, predictive engine 146 may also establish a tokenized (or actual) account number of user 101's account as a candidate parameter value for the source account, and establish a tokenized or actual account number of the additional account held by "Michael Jones" as a candidate parameter value for the destination account.

Referring back to FIG. 3B, predictive engine 146 may perform operations that package each of the candidate values for the parameters that characterize the referenced data exchange, e.g., the P2P transaction described herein, into corresponding elements of candidate parameter value data 350. For example, and as described herein, the candidate values may include one or more parameter values extracted from corresponding portions of first and second user data 342A and 342B, first and second transaction data 344A and 344B, and first and second chatbot session data 346A (e.g., default parameter values specified within customer profile data, account identifiers extracted from corresponding account data, etc.) or identified by NLP engine 144 within corresponding portions of chatbot message data. In other examples, and as described herein, the candidate values may also include one or more parameter values computed by predictive engine 146 based on an application of one or more predictive models (e.g., the deterministic or stochastic statistical processes, machine learning processes, or artificial intelligence models described herein) to structured elements of input data. Predictive engine 146 may provide candidate value data 350 as an input to a deep-link generation module 352 of transaction system 130, which may perform any of the exemplary processes described herein to pre-populate the digital interface associated with the P2P transaction with the determined or predicted candidate parameter values and to generate data that establishes a deep link to the pre-populated digital interface.

Deep-link generation module 352 may receive candidate value data 350, and may access layout data 337, e.g., as maintained within digital interface database 138. As described herein, layout data 337 may identify each of the discrete interface elements disposed within the digital interface associated with the P2P transaction and further, specify the position of each of the discrete interface elements within the digital interface. In some instances, deep-link generation module 352 may perform operations that associated each element of layout data 337, which identifies a corresponding one of the interface elements and specifies a corresponding position, with one of the candidate parameter values specified within candidate value data 350. Further, deep-link generation module 352 may package each of the associated elements of layout data 337 and candidate parameter values into a corresponding portion of pre-populated interface data 354, and perform operations that store pre-populated interface data 354 within a corresponding portion of digital interface database 138.

Further, deep-link generation module 352 may perform operations that generate a deep link to the locally maintained elements of pre-populated interface data 354. The generated deep link may identify pre-populated interface data 354 (and additionally, or alternatively, layout data 337 or metadata 338), and may refer or point a storage location of pre-populated interface data 354, e.g., within digital interface database 138. In some instances, deep-link generation module 352 may generate linking data 356 that identifies and characterizes the generate deep link, and may perform operations that store linking data 356 within the data records of digital interface database 138. Deep-link generation module 352 may perform further operation that associate linking data 356 with transaction type data 332, layout data 337, metadata 338, and pre-populated interface data 354, each of which characterize the digital interface that facilitates an initiation of the P2P transaction.

Figure 3C:
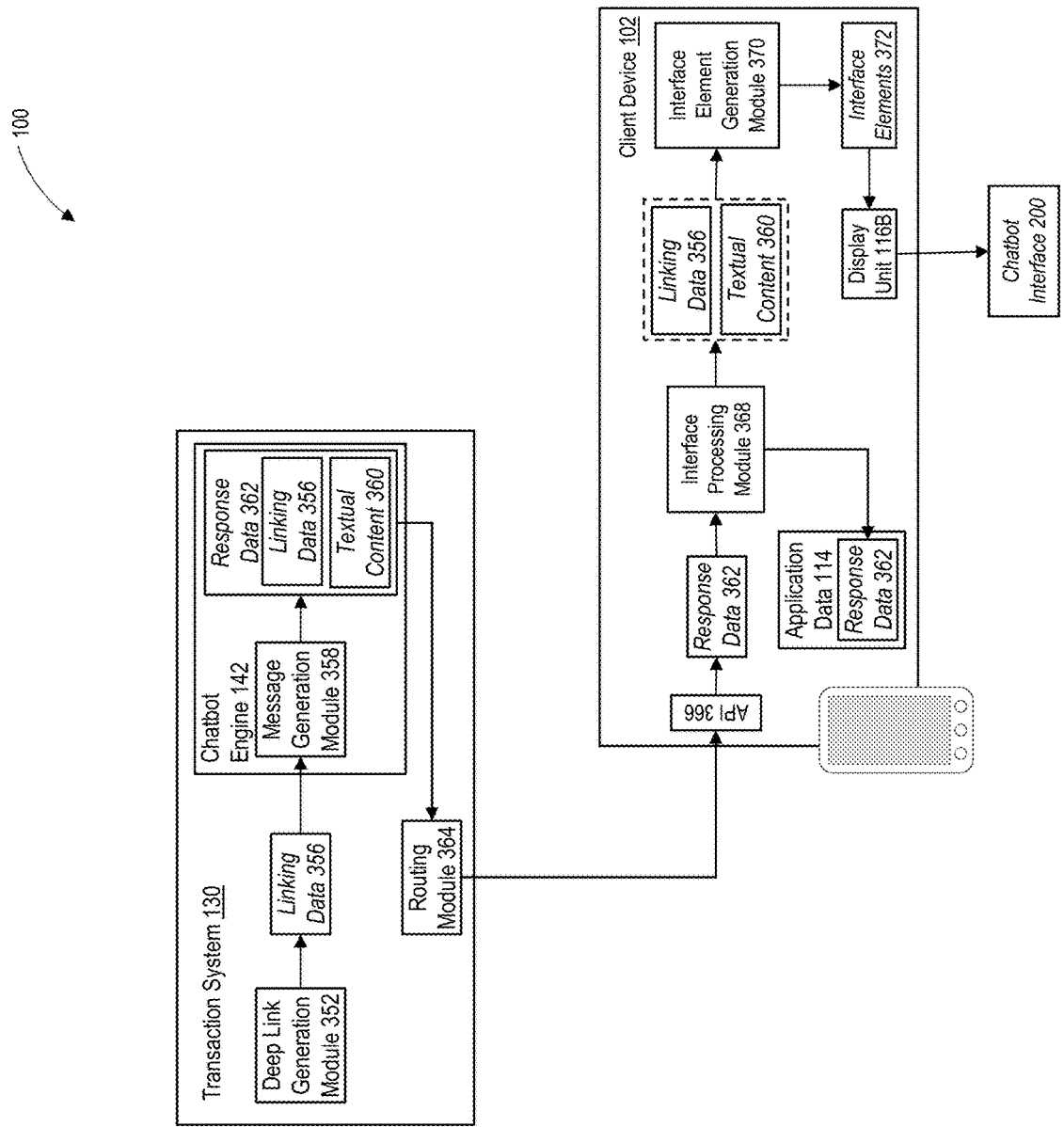

Referring to FIG. 3C, deep-link generation module 352 may provide linking data 356 as an input to a message generation module 358 of chatbot engine 142, which may perform operations that generate a response to message data 304 (e.g., representative of provided input "I need to pay Mike for the hockey tickets") within the established and ongoing chatbot session with client device 102. In some instances, message generation module 358 may programmatically generate textual content 360 that refers to, and response to, message data 304, and may package textual content 360 and linking data 356 into corresponding portions of response data 362. Additionally, message generation module 358 may also package data associated with, or identifying, the established and ongoing chatbot session into response data 362, such as a session identifier or a cryptogram associated with chatbot engine 142.

Message generation module 358 may provide response data 362, which includes textual content 360 and linking data 356 (and in some instances, additional identifiers of the chatbot session or of transaction system 130), as an input to a routing module 364 executed by transaction system 130. Routing module 364 may obtain a network address of client device 102, e.g., from locally maintained session data 302, and may perform operations that cause transaction system 130 to transmit response data 362 across network 120 to the obtained network address of client device 102. By way of example, and when rendered for presentation within a corresponding chatbot interface by executed payment application 108, textual content 360 may prompt user 101 to provide additional input to client device 102 (e.g., via input unit 116B) that selects the deep link included within linking data 356, which causes executed payment application 108 to perform operations that present the pre-populated digital interface associated with the P2P transaction.

A secure programmatic interface of client device 102, e.g., application programming interface (API) 366, may receive and response data 362 to an interface processing module 368 of payment application 108, e.g., as executed by client device 102. API 366 may be associated with or established by interface processing module 368, and may facilitate secure, module-to-module communications across communications network 120 between interface processing module 368 and chatbot engine 142 executed by transaction system 130, e.g., via routing module 364. In some instances, interface processing module 368 may perform operations that stores response data 362 within one or more tangible, non-transitory memories, such as application data 114.

Based on portions of response data 362 (e.g., the information identifying the established and ongoing chatbot session), interface processing module 368 may determine that response data 362 represents a new message within the ongoing and simulated conversation between user 101 and the programmatically generated chatbot maintained by transaction system 130. In some instances, interface processing module 368 may parse response data 362 to extract linking data 356 and textual content 360, which may be provided as inputs to an interface element generation module 370 executed by client device 102. Interface element generation module 370 may perform operations that generate interface elements 372 that represent, and render for presentation, portions of linking data 356 and textual content 360. Further, interface element generation module 370 may route generated interface elements 372 to display unit 116A, which may present interface elements 372 within a corresponding portion of chatbot interface 200, e.g., as part of the ongoing and simulated conversation.

Figure 3D:
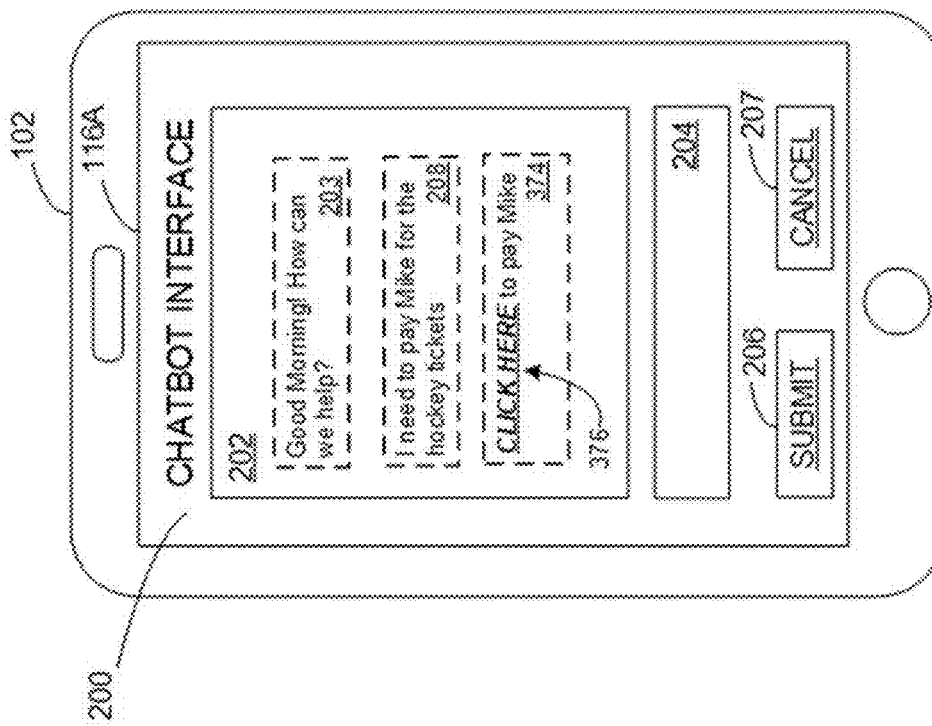
FIG. 3D is a diagram illustrating a portion of an exemplary graphical user interface, in accordance with some embodiments.

Referring to FIG. 3D, and when presented within chatbot session area 202 of chatbot interface 200, interface elements 372 may establish a new message 374 that include a deep link 376 to a populated payment interface that facilitates an initiation of the P2P transaction, and additional textual content 378 that prompts user 101 to select deep link 376 and confirm the pre-populated parameter values that characterize the P2P transaction, e.g., "Click here to pay Mike." In some instances, user 101 may elect to initiate the P2P transaction, and may provide additional input to client device 102, via input unit 116B, that selects deep link 376, e.g., by establishing contact between a finger or a stylus and a portion of a surface of a pressure-sensitive, touchscreen display unit that corresponds to deep link 376.

Figure 4A:
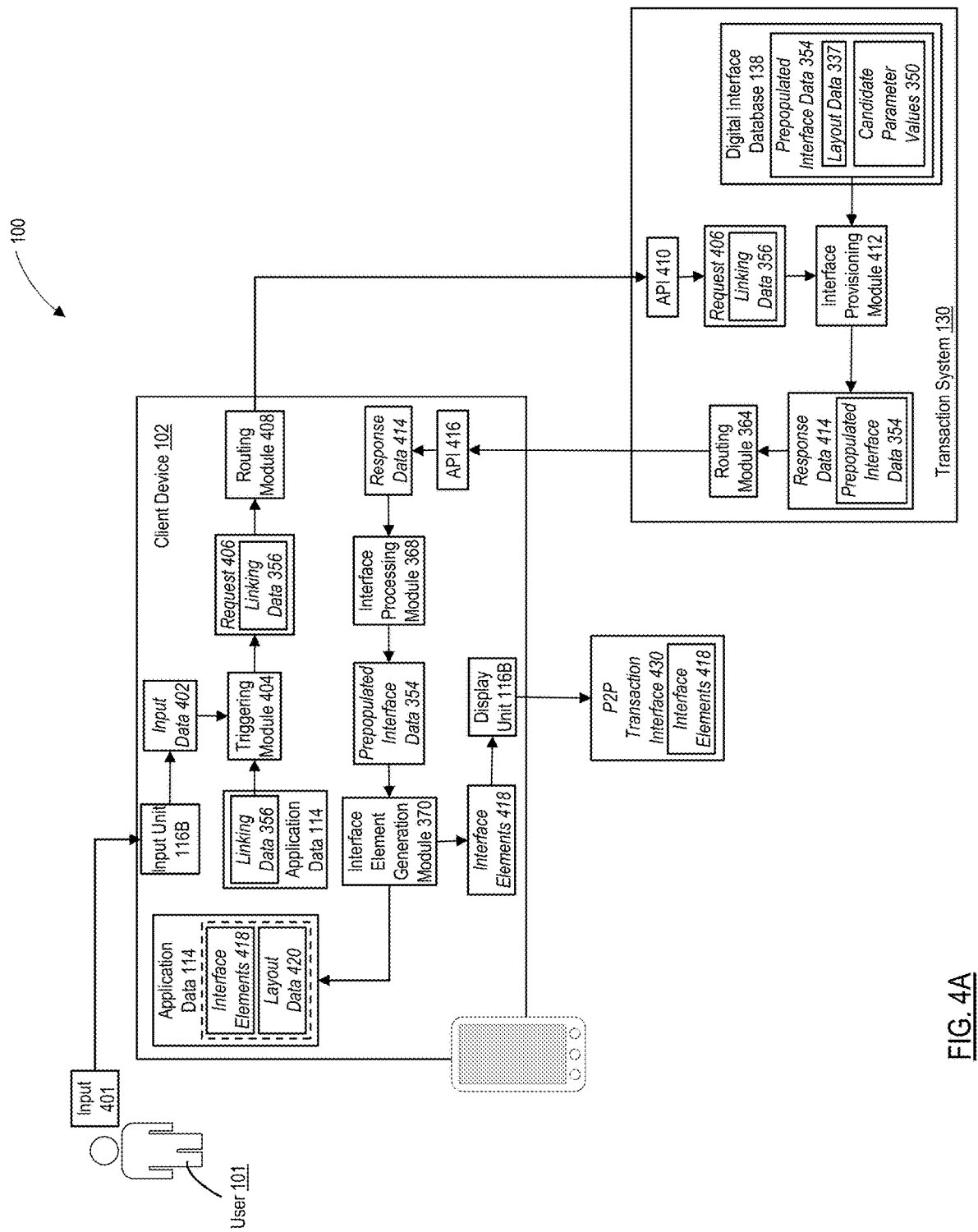
FIG. 4A is a diagram illustrating a portion of an exemplary computing environment, in accordance with some embodiments.

As illustrated in FIG. 4A, input unit 116B may receive input 401 from user 101, and may route input data 402 that characterizes received input 401 to a triggering module 404 of payment application 108, e.g., as executed by client device 102. In some instances, input data 402 may identify one or more spatial positions of user 101's established contact along the surface of the pressure-sensitive, touchscreen display unit, and may also identify a duration of that established content. Triggering module 404 may perform operations that establish that user 101 selected deep link 376 based on portions of generated interface elements 372 and on input data 402 (e.g., that the one or more contact positions correspond to a presented position of deep link 376 within chatbot interface 200).

In response to the determination that user 101 selected deep link 376, triggering module 404 may access locally maintained linking data 356 (e.g., within application data 114), and package all or a portion of linking data 356 into a corresponding portion of a request 406 for the pre-populated interface data associated with deep link 376. In some instances, request 406 may also include the unique identifier of user 101 (e.g., the alphanumeric login credential of user 101), the unique device identifier of client device 102 (e.g., the IP or MAC address of client device 102) and additionally, or alternatively, the unique identifier of payment application 108 (e.g., the application-specific cryptogram described herein). Triggering module 404 may provide request 406 as an input to a routing module 408 executed by client device 102, which may perform operations that cause client device 102 to transmit request 406 across network 120 to a unique network address of transaction system 130.

A secure programmatic interface of transaction system 130, such as an application programming interface (API) 410, may receive and route request 406 to an interface provisioning module 412 of transaction system 130. API 366 may be associated with or established by interface provisioning module 412, and may facilitate secure, module-to-module communications across communications network 120 between interface provisioning module 412 and executed payment application 108, e.g., via routing module 408.

As described herein, request 406 may include at least a portion of linking data 356 and in some instances, may also include the unique identifier of user 101 (e.g., the alphanumeric login credential of user 101), the unique device identifier of client device 102 (e.g., the IP or MAC address of client device 102) and additionally, or alternatively, the unique identifier of payment application 108 (e.g., the application-specific cryptogram described herein). By way of example, interface provisioning module 412 may perform operations (not illustrated in FIG. 4A) that parse request 406 and extract the unique identifiers of user 101, client device 102, or executed payment application 108, and perform operations that authenticate an identity of user 101 or client device 102 (e.g., based on portions of the unique identifiers of user 101 or client device 102) or verify an authenticity of request 406 (e.g., based on the unique identifier of executed payment application 108, such as an application cryptogram).

If interface provisioning module 412 were unable to authenticate the identity of user 101 or client device 102, or to verify the authenticity of request 406, interface provisioning module 412 may generate an error message indicative of the failed authentication or verification, which transaction system 130 may transmit back across network 120 to client device 102. Further, interface provisioning module 412 may perform operations that discard received request 406, and await additional provisioning requests generated by client device 102.

In other instances, and in response to a successful authentication of the identity of user 101 or client device 102, and/or a successful verification of the authenticity of request 406, interface provisioning module 412 may parse request 406 to extract all or a portion of linking data 356. Further, interface provisioning module 412 may perform operations that access the data records of digital interface database 138, and identify and extract one or more elements of pre-populated interface data 354 associated with linking data 356 within the accessed data records. For example, and as described herein, pre-populated interface data 354 may include layout data 337 that identifies each of the interface elements disposed within a digital payment interface associated with the P2P transaction and that specifies a position (e.g., a relative or absolute position) of each of the interface elements within the digital payment interface. Further, and as also described herein, pre-populated interface data 354 may also associate each of the interface elements (and the corresponding absolute or relative position) within a corresponding one or more candidate parameter values for the P2P transaction, e.g., as specified within candidate value data 350.

By way of example, and for the digital payment interface that facilitates the P2P transaction, layout data 337 may identify interface elements (e.g., fillable text boxes, etc.) that facilitate a specification of an identifier of user 101, a counterparty identifier, identifiers of a source account (e.g., as held by user 101) and a destination account (e.g., as held by the identified counterparty), an amount of funds associated with the P2P transaction, and an initiation date or time of the P2P transaction. Further pre-populated interface data 354 may associate each of these interface elements with a corresponding, and appropriate, one of the candidate values specified within candidate value data 350. As described herein, the specified candidate values for the P2P transaction may include, but are not limited to, a candidate payor identifier (e.g., user identifier 306 of user 101), one or more candidate payee identifiers (e.g., a counterparty name, such as "Michael Jones," or a unique counterparty identifier, such as an alphanumeric login names), candidate identifiers of the source and destination accounts (e.g., actual or tokenized account numbers), a candidate transaction value (e.g., $550.00), and a candidate transaction date (e.g., Oct. 14, 2018).

The disclosed embodiments are, however, not limited to these exemplary interface elements and associated candidate values, and in other instances, pre-populated interface data 354 may identify any additional, or alternate type of interface element (e.g., a slider, etc.), which may be associated with any appropriate candidate parameter value. Further, in some examples, pre-populated interface data 354 identify, and specify a position for, one or more additional interface elements that are not associated with corresponding candidate values, such as a selectable icon that facilitates an initiation of the P2P transaction in accordance with pre-populated or modified parameter value, or that facilitates a cancellation of the P2P transaction.

Interface provisioning module 412 may perform operations that package the extracted elements of pre-populated interface data 354 into corresponding portions of response data 414, which interface provisioning module 412 may provide as an input to routing module 364 executed by transaction system 130. In some instances, routing module 364 may obtain a unique network address of client device 102 (e.g., an IP address maintained within customer database 132), and perform operations that cause transaction system 130 to transmit response data 414 across network 120 to the unique network address of client device 102.

As illustrated in FIG. 4A, a secure programmatic interface of client device 102, e.g., application programming interface (API) 416, may receive and route response data 414 interface processing module 368 of payment application 108, e.g., as executed by client device 102. API 416 may be associated with or established by interface processing module 368, and may facilitate secure, module-to-module communications across communications network 120 between interface processing module 368 and interface provisioning module 412 executed by transaction system 130, e.g., via routing module 364. In some instances, interface processing module 368 may perform operations that stores response data 414 within one or more tangible, non-transitory memories, such as application data 114 (not illustrated in FIG. 4A).

In some instances, interface processing module 368 may parse response data 414 to extract pre-populated interface data 354, and may provide pre-populated interface data 354 as an input to interface element generation module 370 (e.g., as executed by client device 102). Based on portions of pre-populated interface data 354, interface element generation module 370 may perform operations that generate populated interface elements 418, which correspond to the interface elements of the P2P transaction interface populated (when appropriate) with corresponding ones of the associated candidate values, and layout data 420, which specifies a size, position, or visual characteristic (e.g., color, etc.) of each of the populated interface elements when presented on display unit 116A. Interface element generation module 370 may store populated interface elements 418 and layout data 420 within a tangible, non-transitory memory, e.g., within application data 114, and may route populated interface elements 418 and layout data 420 to display unit 116A, which may perform operations that present each of populated interface elements 418 within the P2P transaction interface, e.g., P2P transaction interface 430, in accordance with layout data 420.

Figure 4B:
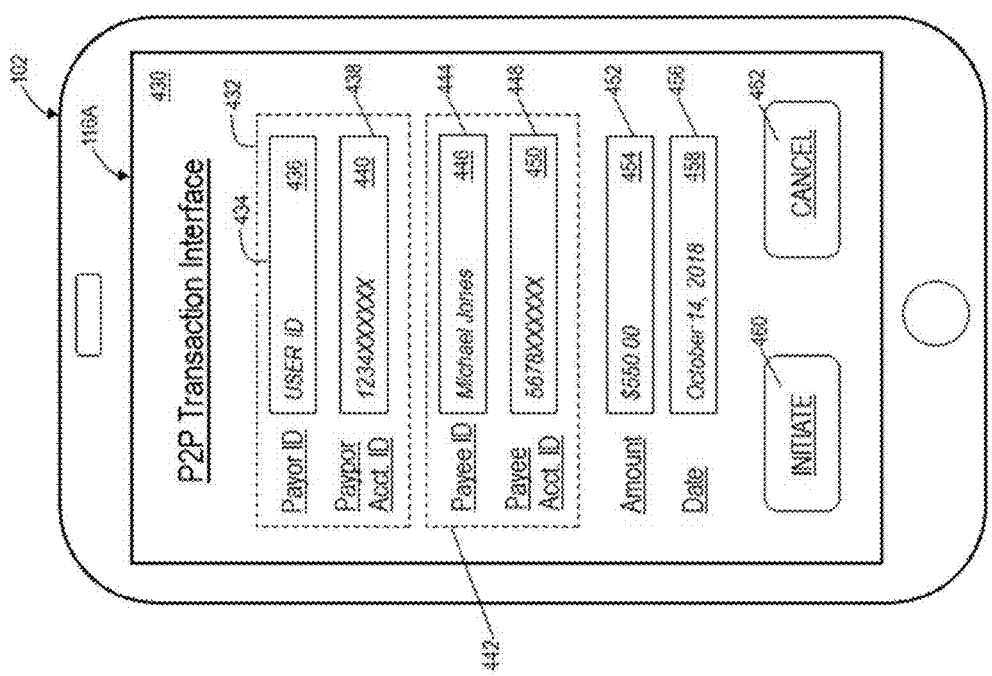
FIG. 4B is a diagram illustrating a portion of an exemplary graphical user interface, in accordance with some embodiments.

Referring to FIG. 4B, P2P transaction interface 430 may include interface elements 432 associated with a corresponding payor of the P2P transaction (e.g., user 101) and interface elements 442 associated with a corresponding payee of the P2P transaction (e.g., the counterparty, identified as "Michael Jones"). For example, payor interface elements 432 may include, but are not limited to: an interface element 434 that identifies the payor, e.g., user 101, and that is populated with a candidate identifier 436 of user 101; and interface element 438 that identifies a source account capable of funding the P2P transaction, and that is populated within a candidate identifier 440 of the source account, e.g., a tokenized account number of a deposit account held by user 101. Similarly, and by way of example, payee interface elements 442 may include, but are not limited to: an interface element 444 that identifies the payee, and that is populated with a candidate identifier 446 of the payee (e.g., "Michael Jones"); and interface element 448 that identifies a destination account capable of received funds electronically transferred from the payor's source account, and that is populated within a candidate identifier 450 of the destination account, e.g., a tokenized account number of a deposit account held by the payee.

As illustrated in FIG. 4B, P2P transaction interface 430 may include an interface element 452 that identifies a transaction amount associated with the P2P transaction (e.g., subject to electronic transfer from the source to the destination account), and that is populated with the candidate transaction value 454 of $550.00. Further, P2P transaction interface 430 may also include an interface element 456 that identifies a transaction data associated with the P2P transaction, and that is populated with the candidate transaction date 458 of Oct. 14, 2018. In additional instances, illustrated in FIG. 4B, P2P transaction interface 430 may also include interface elements 460 and 462 (e.g., selectable icons). The disclosed embodiments are, however, not limited to these exemplary interface elements (and in some instances, populated candidate values) and in other examples, P2P transaction interface 430 may include any additional or alternate interface elements, with or without populated candidate values, that would be appropriate to the P2P transaction.

In some instances, user 101 may view the populated candidate values for each of the interface elements within P2P transaction interface 430, and may elect to initiate the P2P transaction in accordance with the populated candidate values. To initiate the P2P transaction in accordance with the populated candidate values, user 101 may provide a single additional input to client device 102, e.g., via input unit 116B, that selects interface element 460, e.g., a selectable "Request Initiation" icon. For example, and to select interface element 460, user 101 may establish contact between a finger or a stylus and a portion of a surface of a pressure-sensitive, touchscreen display unit that corresponds to interface element 460. In other examples, user 101 may utter a particular spoken comment (e.g., an utterance of "initiate transaction," etc.), which may be captured by a microphone embedded into input unit 116B or communicative coupled to client device 102, and client device 102 may apply one or more speech recognition algorithms or natural language processing algorithms the captured audio input to confirm the user's intention to initiate the P2P transaction in accordance with the populated candidate values.

In other instances, and prior to requesting an initiation of the P2P transaction, user 101 may provide further input to client device 102, e.g., via input unit 116B, that modifies the candidate parameter value populated into one, or more, of interface elements 434, 438, 444, 448, 452, or 456. Further, in some instances, user 101 may provide, to client device 102, any of the exemplary forms of input to select interface element 462, which causes client device 102 to cancel the potential P2P transaction and delete the populated candidate values from each of presented interface elements 434, 438, 444, 448, 452, and 456.

Figure 4C:
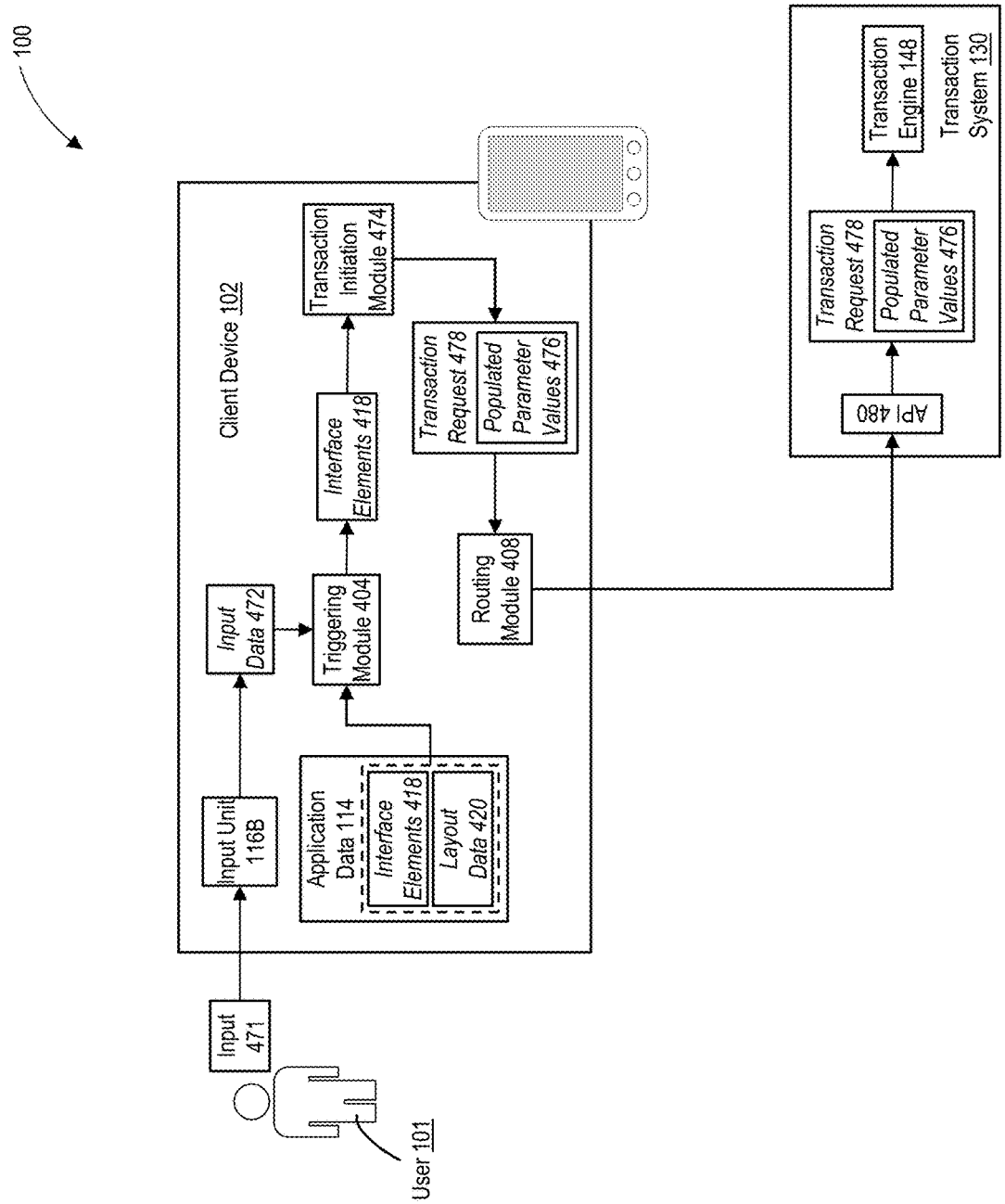
FIG. 4C is a diagram illustrating a portion of an exemplary computing environment, in accordance with some embodiments.

As illustrated in FIG. 4C, input unit 116B may receive input 471 from user 101, which may be indicative of user 101's selection of interface element 460 and user 101's intention to initiate the P2P transaction in accordance with the populated candidate values Input unit 1166 may route input data 472 that characterizes received input 401 to triggering module 404 of payment application 108, e.g., as executed by client device 102. In some instances, input data 402 may identify one or more spatial positions of user 101's established contact along the surface of the pressure-sensitive, touchscreen display unit, and may also identify a duration of that established content. Triggering module 404 may perform operations that establish that user 101 selected interface element 460 based on input data 472 and corresponding portions of populated interface elements 418 and layout data 420 (e.g., that the one or more contact positions correspond to a presented position of interface element 460 within P2P interface 422).

In response to the determination that user 101 selected interface element 460, triggering module 404 may obtain populated interface elements 418 from application data 114, and provide populated interface elements 418 as an input to a transaction initiation module 474 of payment application 108, e.g., as executed by client device 102. Transaction initiation module 474 may parse populated interface elements 418 to extract populated parameter values 476 that characterize the requested P2P transaction (e.g., the payee and payor identifiers, the identifiers of the source and destination accounts, the $550.00 transaction value, and the transaction initiation date of Oct. 14, 2018). Further, transaction initiation module 474 may perform operations that package populated parameter values 476 into a corresponding portion of a transaction request 478. In some instances, transaction request 478 may also include the unique identifier of user 101 (e.g., the alphanumeric login credential of user 101), the unique device identifier of client device 102 (e.g., the IP or MAC address of client device 102) and additionally, or alternatively, the unique identifier of payment application 108 (e.g., the application-specific cryptogram described herein). Transaction initiation module 474 may provide transaction request 478 as an input to routing module 408 executed by client device 102, which may perform operations that cause client device 102 to transmit transaction request 478 across network 120 to a unique network address of transaction system 130.

A secure programmatic interface of transaction system 130, such as an application programming interface (API) 480, may receive and route transaction request 478 to transaction engine 148 executed by of transaction system 130. API 480 may be associated with or established by transaction engine 148, and may facilitate secure, module-to-module communications across communications network 120 between transaction engine 148 and executed payment application 108, e.g., via routing module 408.

In some example, transaction engine 148 may perform operations (not illustrated in FIG. 4C) that parse transaction request 478 and extract the unique identifiers of user 101, client device 102, or executed payment application 108, and perform operations that authenticate an identity of user 101 or client device 102 (e.g., based on portions of the unique identifiers of user 101 or client device 102) or verify an authenticity of transaction request 478 (e.g., based on the unique identifier of executed payment application 108, such as an application cryptogram).

If transaction engine 148 were unable to authenticate the identity of user 101 or client device 102, or to verify the authenticity of transaction request 478, transaction engine 148 may generate an error message indicative of the failed authentication or verification, which transaction system 130 may transmit back across network 120 to client device 102. Further, interface provisioning module 412 may perform operations that discard received transaction request 478, and await additional provisioning requests generated by client device 102.

In other instances, and in response to a successful authentication of the identity of user 101 or client device 102, and/or a successful verification of the authenticity of transaction request 478, transaction engine 148 may parse transaction request 478 to extract all or a portion of populated parameter values 476. Further, transaction engine 148 may perform operations that initiate the requested P2P transaction in accordance with corresponding ones of populated parameter values 476, e.g., an electronic transfer of $550.00 from the deposit account of user 101 (e.g., as specified by the source account identifier) to the deposit account of counterparty "Michael Jones" (e.g., as specified by the destination account identifier) on Oct. 14, 2018.

Figure 5A:
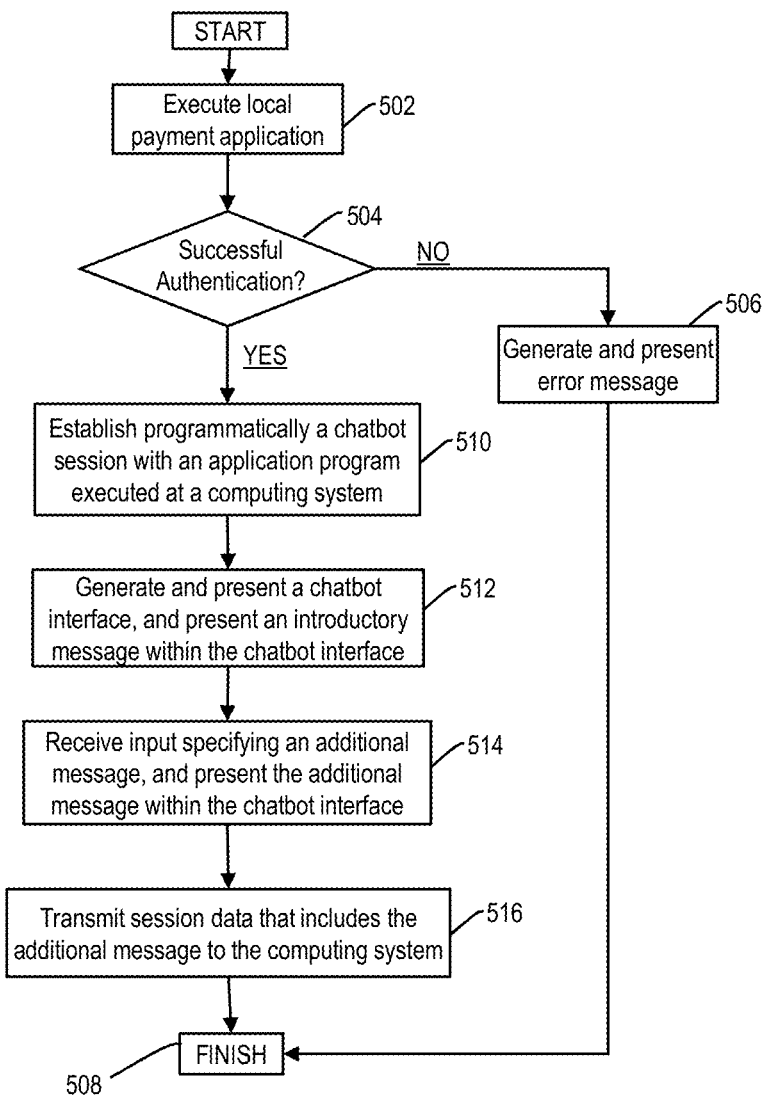
FIGS. 5A, 5B, 6A, 6B, and 6C are flowcharts of exemplary processes for automatically populating and provisioning deep-linked interfaces, in accordance with some embodiments.
Figure 5B:
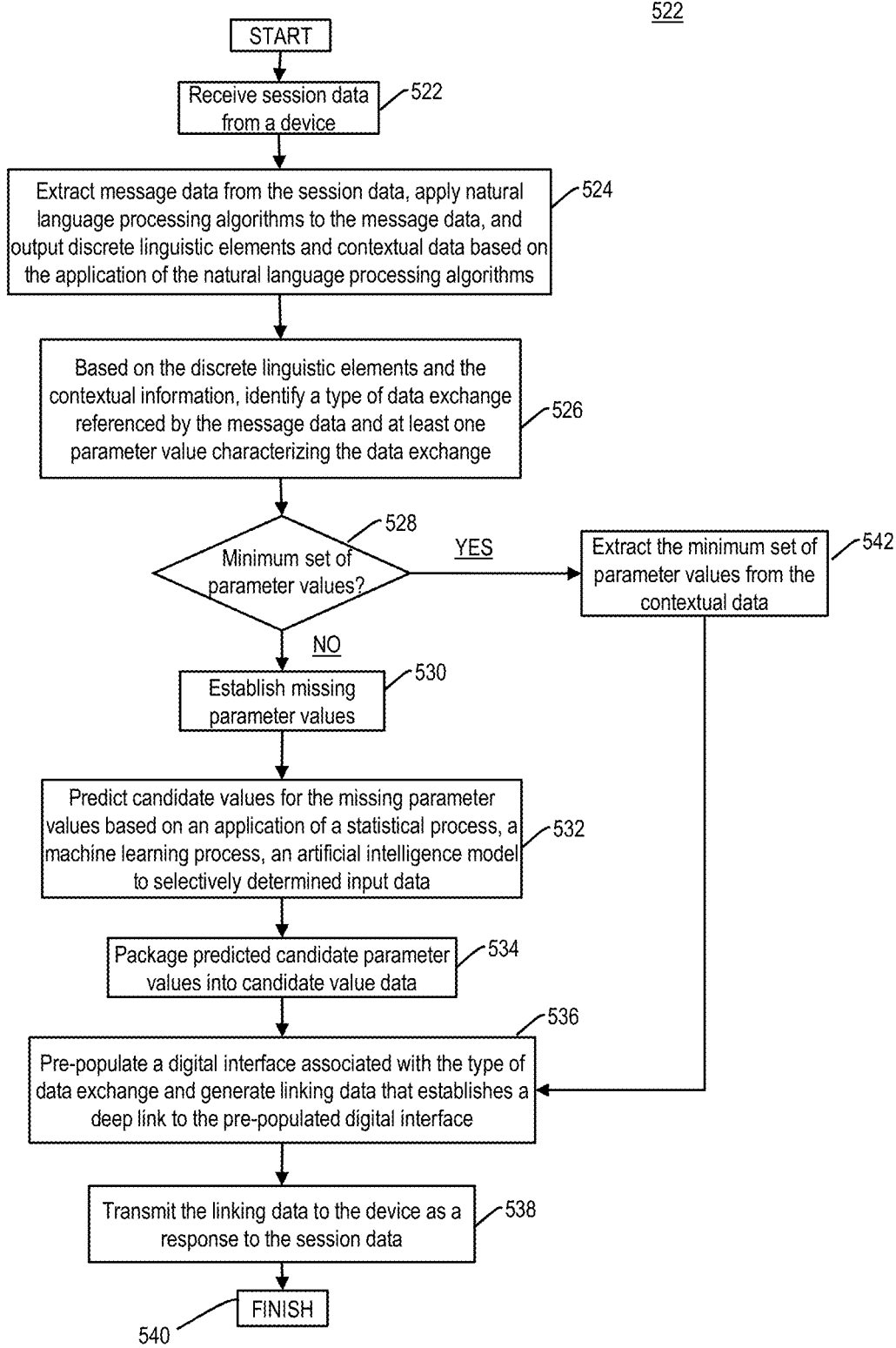

FIGS. 5A and 5B are flowchart of exemplary processes 500 and 520 for automatically populating and provisioning deep-linked interfaces during programmatically established chatbot sessions, in accordance with the disclosed exemplary embodiments. For example, a network-connected device operating within environment 100, such as client device 102, may perform one or more of the steps of exemplary process 500 (e.g., as illustrated in FIG. 5A), and a network-connected computing system operating within environment 100, such as transaction system 130, may perform one or more of the steps of exemplary process 520 (e.g., as illustrated in FIG. 5B).

Referring to FIG. 5A, client device 102 may perform operations that, in response to input received from user 101 via input unit 116B, executes a locally maintained application program, such as payment application 108 described herein (e.g., in step 502). By way of example, and as described herein, the input may correspond to a selection by user 101 of an icon of payment application 108 displayed on a pressure-sensitive touchscreen display, such as display unit 116A, e.g., based on an established contact between a stylus or finger and a portion of a surface of the pressure-sensitive touchscreen display associated with the displayed icon.

In some instances, in step 504, client device 102 may perform any of the exemplary processes described herein that authenticate an identity of user 101 based on additional user input specifying one or more alphanumeric login or authentication credentials e.g., a login name, a password, etc.) and additionally, or alternatively, one or more biometric credentials, such as fingerprint data or a digital image of a portion of user 101's face. If client device 102 were unable to authenticate the identity of user 101 (e.g., step 504; NO), client device 102 may perform additional operations that generate and present an error message on display unit 116A (e.g., in step 506). The error message may, in some instances, prompt user 101 to re-enter one or more of the login, authentication, or biometric credentials, or to contact a financial institution associated with executed payment application 108. Exemplary process 500 is then complete in step 508.

Alternatively, if client device 102 were to authenticate the identity of user 101 (e.g., step 504; YES), client device 102 may perform any of the exemplary processes described herein to establish programmatically a chatbot session with an application program executed by a network-connected computing system, such as executed chatbot engine 142 of transaction system 130 (e.g., in step 510). In response to the establishment of the chatbot session, client device 102 may perform any of the exemplary processes described herein to generate, and render for presentation on display unit 116A, a corresponding digital interface (e.g. chatbot interface 200 of FIG. 2A) that includes an introductory message (e.g., introductory message 203 of FIG. 2A, stating "Good Morning! How can we help?") generated programmatically by executed chatbot engine 142 (e.g., in step 512).

In some instances, and in response to the presented introductory message, client device 102 may receive, via input unit 116B, additional user input specifying an additional message within the ongoing simulated conversation with executed chatbot engine 142, and may perform any of the exemplary processes described herein to generate and present a representation of the additional message within a portion of the chatbot interface (e.g., in step 514). By way of example, the additional message may be associated with a request to initiate an exchange of data with one or more counterparties (e.g., the P2P transaction referenced in message 208 of FIG. 2B, stating that "I need to pay Mike for the hockey tickets). As described herein, client device 102 may perform any of the exemplary processes described herein to package the received user input into a corresponding portion of session data, along with one of more of a unique identifier of user 101 (e.g., the alphanumeric login name, etc.), client device 102 (e.g., an IP address of MAC address, etc.), or executed payment application 108 (e.g., an application-specific cryptogram), and transmit the session data across network 120 to transaction system 130 (e.g., in step 516). Exemplary process 600 is then complete in step 508.

Referring to FIG. 5B, transaction system 130 may receive the session data through a secure, programmatic interface (e.g., in step 522). As described herein, the received session data may include message data, which represents the message provided by user 101 as an input to the chatbot interface (e.g., "I need to pay Mike for the hockey tickets"), along with the identifier of user 101 (e.g., the alphanumeric login credential, etc.), the identifier of client device 102 (e.g., the IP or MAC address, etc.), and/or the identifier of executed payment application 108 (e.g., the application cryptogram).

Transaction system 130 may parse the received session data to extract the message data, and may perform operations that apply any of the exemplary natural language processing algorithms to all or a portion of the extracted message data (e.g., in step 524). Based on the application of these natural language processing algorithms, transaction system 130 may identify one or more discrete linguistic elements (e.g., a word, a combination of morphemes, a single morpheme, etc.) within the message data, and may establish a context and a meaning of combinations of the discrete linguistic elements, e.g., based on the identified discrete linguistic elements, relationships between these discrete linguistic elements, and relative positions of these discrete linguistic elements within the message data (e.g., also in step 524). In some instances, also in step 524, transaction system 130 may generate and output linguistic element data, which includes each discrete linguistic element, and contextual information that specifies the established context or meaning of the combination of the discrete linguistic elements.

In some instances, in step 526, transaction system 130 may perform any of the exemplary processes described herein to determine, based on the discrete linguistic elements and contextual information, a type of an exchange of data referenced in, or requested by, the message data (e.g., a peer-to-peer (P2P) transaction involving user 101 and "Mike"), and to determine values of one or more parameters that characterize the type of data exchange (e.g., the incompletely specified potion of the payee identifier "Mike" associated with the P2P transaction, the "hockey tickets" that identify the product involved in the P2P exchange, etc.). Further, transaction system 130 may perform any of the exemplary processes described herein to determine whether the contextual information specifies parameter values sufficient to initiate and execute the corresponding type of data exchange (e.g., in step 528).

For example, in step 528, transaction system 130 may perform operations that obtain elements of layout data and metadata that characterize a digital interface associated with the determine type of data exchange, e.g., the P2P transaction involving "Mike." As described herein, the layout data may include information that identifies one or more discrete interface elements disposed within the digital interface associated with the P2P transaction and further, that that specifies a position of each of the discrete interface elements within the corresponding digital interface. Further, and as described herein, the metadata may identify and characterize a parameter value associated with each of the discrete interface elements disposed within the corresponding digital interface, and in some instances, the identified and characterized parameter values may collectively establish a minimum set of parameter values that facilitate an initiation and an execution of the determined type of data exchange, e.g., the P2P transaction.

In some examples, transaction system 130 may perform and of the exemplary processes described herein to operations that compare the complete or incomplete parameter values specified within the contextual data against the minimum set of parameter values necessary to initiate and execute the determined type of data exchange, as specified within the metadata (e.g., in step 528). If transaction system 130 were to determine that the contextual data fails to include one or more of the minimum set of parameter values necessary to initiate and execute the particular type of data exchange (e.g., step 528; NO), transaction system 130 may establish the one or more of the minimum set of parameter values as missing parameter values (e.g., in step 530).

Further, transaction system 130 may perform any of the exemplary processes described herein to predict candidate values for each of the missing parameter values that consistent with customer data characterizing user 101, transaction data characterizing one or more prior exchanges of data involving user 101 or client device 102, and chatbot session data characterizing one or more prior chatbot sessions involving user 101 and executed chatbot engine 142 (e.g., in step 532). For example, in step 532 transaction system 130 may perform any of the exemplary processes described herein to extract one or more of the missing parameter values from a corresponding portion of the customer, transaction, and/or chatbot session data, such as, but not limited to, a default payee identifier or a default source or destination account (e.g., also in step 532).

In other examples, also in step 532, transaction system 130 may perform any of the exemplary processes described herein that, for one or more of the missing parameter values, predict a corresponding candidate parameter value based on an application of one or predictive models to model input data selectively extracted or derived from portions of the customer, transaction, chatbot session data, and/or other historical data (e.g., that characterizes and interaction between client device 102 and transaction system 130, an interaction between user 101 and one or more financial institutions, such as the financial institution that operates transaction system 130, or an interaction between user 101 and other chatbots via application programs associated with financial institutions or other retailers, utilities, or other businesses.

Examples of the stochastic statistical process can include, among other things, a support vector machine (SVM) model, a multiple regression algorithm, a least absolute selection shrinkage operator (LASSO) regression algorithm, or a multinomial logistic regression algorithm, and examples of the machine learning process can include, but are not limited to, an association-rule algorithm (such as an Apriori algorithm, an Eclat algorithm, or an FP-growth algorithm) or a clustering algorithm (such as a hierarchical clustering process, a k-means algorithm, or other statistical clustering algorithms). Further, examples of the artificial intelligence models include, but are not limited to, an artificial neural network model, a recurrent neural network model, a Bayesian network model, or a Markov model. As described herein, these stochastic statistical processes, machine learning processes, or artificial intelligence models can be trained against, and adaptively improved using, training data having a specified composition and corresponding outcome data, and can be deemed successfully trained and ready for deployment when a model accuracy (e.g., as established based on a comparison with the outcome data), exceeds a threshold value.

Referring back to FIG. 5B, transaction system 130 may perform operations that package the determined or predicted candidate values for the parameters that characterize the referenced data exchange, e.g., the P2P transaction described herein, into corresponding elements of candidate value data (e.g., in step 534). Based on the candidate value data, transaction system 130 may also perform any of the exemplary processes described herein to pre-populate the digital interface associated with the P2P transaction with the determined or predicted candidate parameter values and to generate linking data that establishes a deep link to the pre-populated digital interface (e.g., in step 536).

Further, and as described herein, transaction system 130 may generate a response to the received session that includes the generated linking data (and in some instances, textual content that described the deep link to the pre-populated interface data), and transmit the generated response across network 120 to a network address of client device 102 (e.g., in step 538). By way of example, and when rendered for presentation within a corresponding chatbot interface by executed payment application 108, the generated response may prompt user 101 to provide additional input to client device 102 (e.g., via input unit 116B) that selects the deep link included within the linking data, which causes executed payment application 108 to perform operations that present the pre-populated digital interface associated with the P2P transaction. Exemplary process 520 is then complete in step 540.

Referring back to step 528, if transaction system 130 were to determine that the contextual data include each of the minimum set of parameter values necessary to initiate and execute the particular type of data exchange (e.g., step 528; YES), transaction system 130 may perform operations that extract at least the minimum set of parameter values from the contextual data (e.g., in step 542). Exemplary process 520 may then pass back to step 536, and transaction system 130 may exemplary processes described herein to pre-populate the digital interface associated with the P2P transaction with the extracted parameter values and to generate linking data that establishes the deep link to the pre-populated digital interface.

Figure 6A:
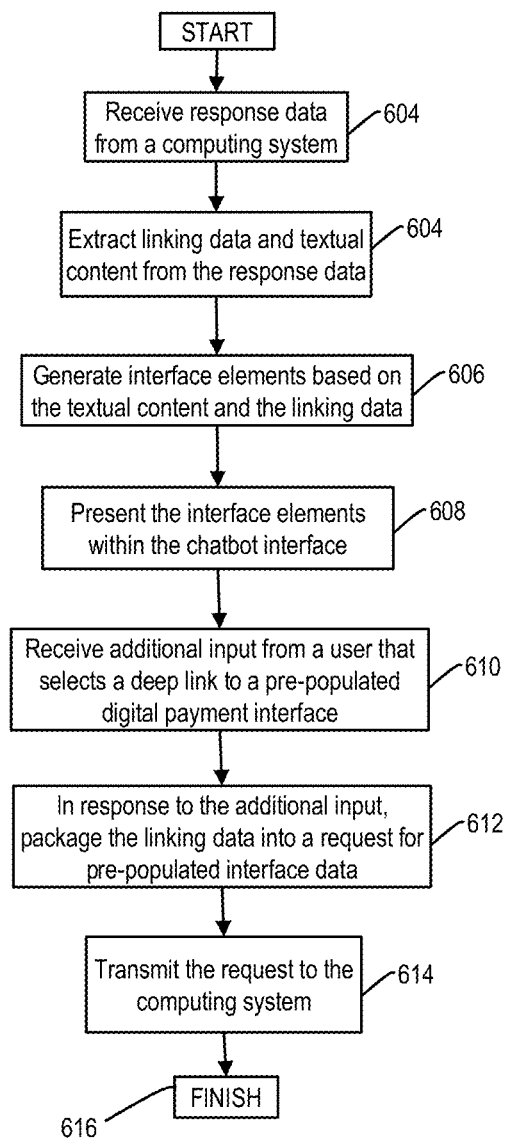
Figure 6B:
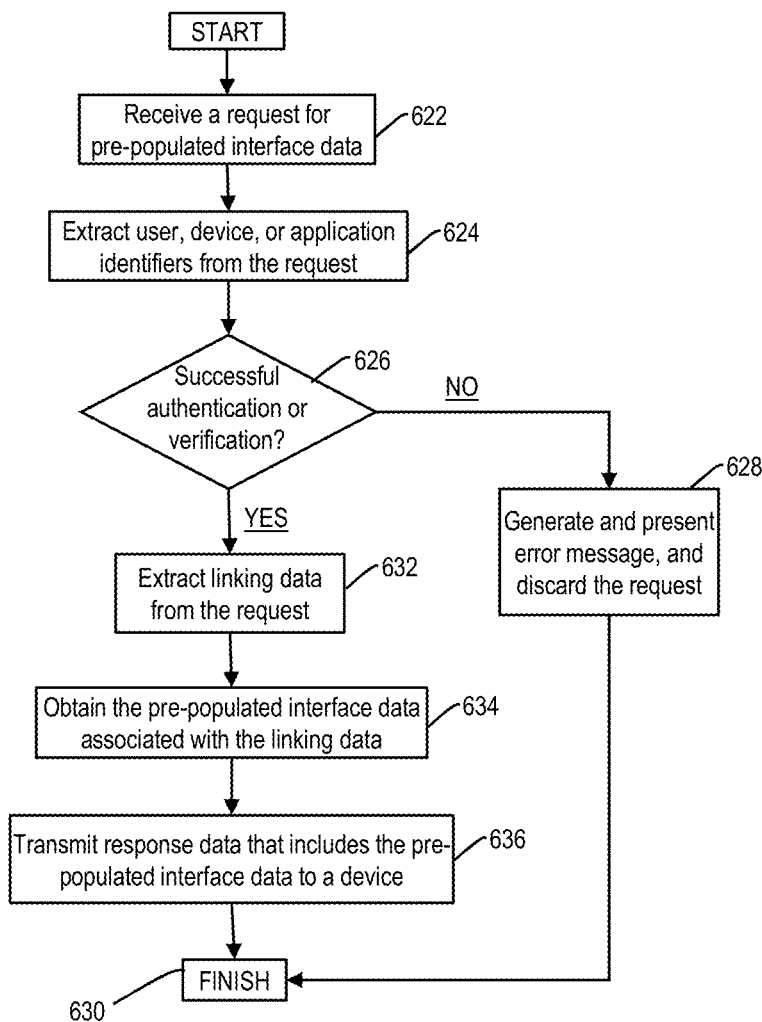
Figure 6C:
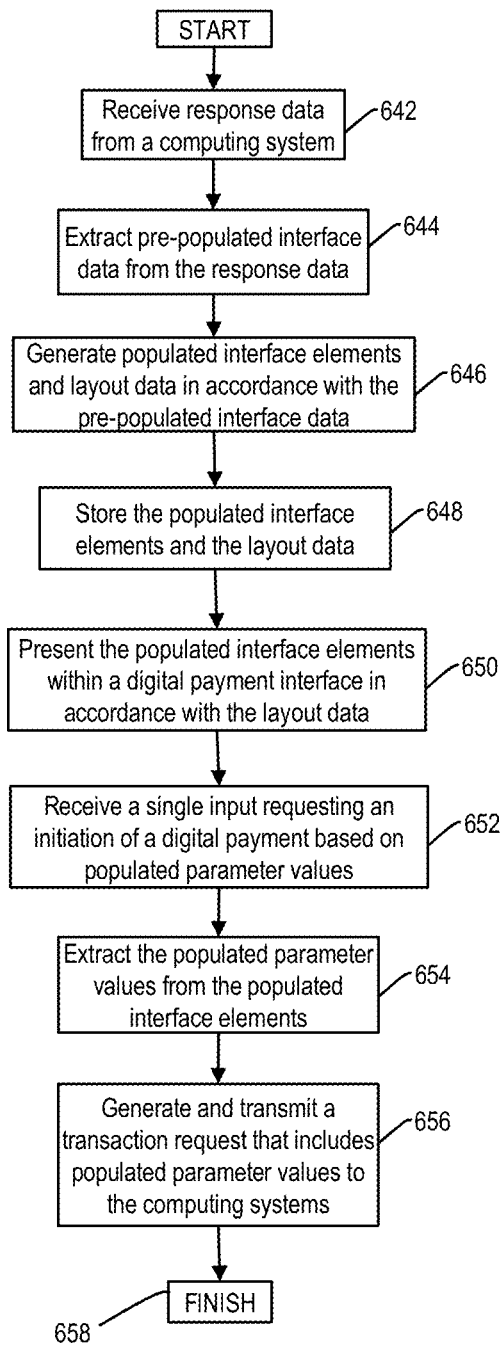

FIGS. 6A, 6B, and 6C are flowcharts of exemplary processes 600, 620, and 640 for automatically populating and provisioning deep-linked interfaces during programmatically established chatbot sessions, in accordance with the disclosed exemplary embodiments. For example, a network-connected device operating within environment 100, such as client device 102, may perform one or more of the steps of exemplary processes 600 and 640 (e.g., as illustrated in respective ones of FIGS. 6A and 6C), and a network-connected computing system operating within environment 100, such as transaction system 130, may perform one or more of the steps of exemplary process 620 (e.g., as illustrated in FIG. 6B).

Referring to FIG. 6A, client device 102 may receive a response data from executed chatbot engine 142 of transaction system 130 across a secure, programmatic interface (e.g., in step 602). For example, and as described herein, client device 102 may determine that the response data represents a new message within the ongoing and simulated conversation between user 101 and the programmatically generated chatbot established by executed chatbot engine 142 of transaction system 130.

Further, in some instances, client device 102 may parse the response data to extract linking data, which identifies and characterizes a deep link to pre-populated interface data maintained at transaction system 130, and textual content, which characterizes the deep link and the corresponding pre-populated digital interface (e.g., in step 604). By way of example, the pre-populated interface data may associate interface elements disposed within a digital interface (e.g., the P2P transaction interface described herein) with corresponding spatial positions within the digital interface and corresponding candidate parameter vales, and the textual content may identify the P2P transaction and the P2P transaction interface, and characterize the deep link.

Client device 102 may perform any of the exemplary processes described herein to generate interface elements that represent, and render for presentation, portions of the linking data and the textual content (e.g., in step 606). Further, in step 608, client device 102 may present the generated interface elements as an additional message within a corresponding portion of a digital interface associated with the established chatbot session, e.g., as part of the ongoing and simulated conversation. The additional message may, for example, include a deep link to a populated payment interface that facilitates an initiation of the P2P transaction, and additional elements of textual content that prompts user 101 to select the deep link and confirm the pre-populated parameter values that characterize the P2P transaction. In some instances, user 101 may elect to initiate the P2P transaction, and client device 102 may receive any of the exemplary input described herein that indicates user 101's selection of the deep link, such as, but not limited to, an established contact between a finger or a stylus of user 101 and a portion of a surface of a pressure-sensitive, touchscreen display unit that corresponds to the deep link (e.g., in step 610).

In response to the receipt of the additional input selecting the deep link, client device 102 may perform any of the exemplary processes described herein to package all or a portion of the linking data into a corresponding portion of a request 406 for the pre-populated interface data associated with the now-selected deep link (e.g., in step 612). In some instances, the generated request 406 also include the unique identifier of user 101 (e.g., the alphanumeric login credential of user 101), the unique device identifier of client device 102 (e.g., the IP or MAC address of client device 102) and additionally, or alternatively, the unique identifier of payment application 108 (e.g., the application-specific cryptogram described herein). Client device 102 may perform additional operations that transmit the generated request across network 120 to transaction system 130 (e.g., in step 614). Exemplary process 600 is then complete in step 616.

Referring to FIG. 6B, transaction system 130 may receive the generated request from client device 102 via a secure, programmatic interface (e.g., in step 622). As described herein, the generated request may include at least a portion of the linking data and in some instances, may also include the unique identifier of user 101 (e.g., the alphanumeric login credential of user 101), the unique device identifier of client device 102 (e.g., the IP or MAC address of client device 102) and additionally, or alternatively, the unique identifier of payment application 108 (e.g., the application-specific cryptogram described herein). By way of example, transaction system 130 may parse the request and extract the unique identifiers of user 101, client device 102, or executed payment application 108 (e.g., in step 624). In step 626, transaction system 130 may perform any of the exemplary processes described herein to authenticate an identity of user 101 or client device 102 (e.g., based on portions of the unique identifiers of user 101 or client device 102) or to verify an authenticity of the generated request (e.g., based on the unique identifier of executed payment application 108, such as an application cryptogram).

If transaction system 130 were unable to authenticate the identity of user 101 or client device 102, or to verify the authenticity of the request (e.g., step 626; NO), transaction system 130 may generate and transmit an error message indicative of the failed authentication or verification across network 120 to client device 102 and may perform operations that discard received the request (e.g., in step 628). Exemplary process 620 is then complete in step 630.

In other instances, and in response to a successful authentication of the identity of user 101 or client device 102 and/or a successful verification of the authenticity of the request (e.g., step 626; YES), transaction system 130 may parse the request to extract all or a portion of the linking data (e.g., in step 632). Based on the extracted linking data, transaction system 130 may perform any of the exemplary processes described herein to obtain one or more elements of pre-populated interface data associated with the linking data (e.g., in step 634). Transaction system 130 may perform additional operations that package the extracted elements of pre-populated interface data into corresponding portions of response data, which transaction system 130 may transmit across network 120 to a unique network address of client device 102 (e.g., in step 636). Exemplary process 620 is then complete in step 630.

Referring to FIG. 6C, client device 102 may receive the response data via a secure programmatic interface (e.g., in step 642), and may parse linked response data to extract the elements of pre-populated interface data (e.g., in step 644). In some instances, client device 102 may perform any of the exemplary processes described herein generate populated interface elements, which correspond to the interface elements of the P2P transaction interface populated (when appropriate) with corresponding ones of the associated candidate values, and layout data, which specifies a size, position, or visual characteristic (e.g., color, etc.) of each of the populated interface elements when presented on display unit 116A (e.g., in step 646). Client device 102 may also perform operations that store the populated interface elements 418 and the layout data within a tangible, non-transitory memory, e.g., within application data 114 (e.g., in step 648).

Further, client device 102 may also perform operations that present each of the populated interface elements within the P2P transaction interface, e.g., P2P transaction interface 430 of FIG. 4C, in accordance with corresponding portions of the layout data (e.g., in step 650). In some instances, as described herein, user 101 may view the populated candidate values for each of the interface elements within P2P transaction interface 430, and may elect to initiate the P2P transaction in accordance with the populated candidate values. To initiate the P2P transaction in accordance with the populated candidate values, user 101 may provide a single additional input to client device 102, e.g., via input unit 116B, that selects a corresponding one of the interface elements, e.g., interface element 460 associated with a selectable "Request Initiation" icon of FIG. 4B. For example, and to select interface element 460, user 101 may establish contact between a finger or a stylus and a portion of a surface of a pressure-sensitive, touchscreen display unit that corresponds to interface element 460. In other examples, user 101 may utter a particular spoken comment (e.g., an utterance of "initiate transaction," etc.), which may be captured by a microphone embedded into input unit 116B or communicative coupled to client device 102, and client device 102 may apply one or more speech recognition algorithms or natural language processing algorithms the captured audio input to confirm the user's intention to initiate the P2P transaction in accordance with the populated candidate values.

In some instances, client device 102 may receive the single additional input (e.g., in step 652), which is indicative of user 101's determination to initiate the P2P transaction in accordance with the populated candidate value. In response to the received input, client device 102 may perform any of the exemplary processes described herein to obtain the populated interface elements from application data 114, and parse the populated interface elements to extract populated parameter values characterizing the requested P2P transaction (e.g., in step 654). Further, in step 654, client device 102 may perform operations that package the populated parameter values into a corresponding portion of a transaction request, along with one or more of the unique identifier of user 101 (e.g., the alphanumeric login credential of user 101), the unique device identifier of client device 102 (e.g., the IP or MAC address of client device 102) and additionally, or alternatively, the unique identifier of payment application 108 (e.g., the application-specific cryptogram described herein). Client device 102 may transmit the transaction request across network 120 to transaction system 130 (e.g., in step 656), and transaction system 130 may perform any of the exemplary processes described herein to initiate the P2P transaction in accordance with the populated parameter values. Exemplary process 640 is then complete in step 658.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, such as, but not limited to, application programs 140, chatbot engine 142, NLP engine 144, predictive engine 146, transaction engine 148, API 320, initialization module 322, session management module 324, transaction detection module 330, parameter determination module 334, deep link generation module 352, message generation module 358, routing module 364, API 366, interface processing module 368, interface element generation module 370, triggering module 404, routing module 408, API 410, interface provisioning module 412, API 416, and transaction initiation module 474, can be implemented as one or more computer programs, i.e., one or more modules of computer program instructions encoded on a tangible non-transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
a communications unit;
a storage unit storing instructions; and
at least one processor coupled to the communications unit and the storage unit, the at least one processor being configured to execute the instructions to:
receive, via the communications unit, a first signal from a device that includes messaging information;
determine a candidate parameter value for a first parameter of an exchange of data based on the messaging information and on information characterizing prior exchanges of data between the device and the apparatus;
generate interface data based on the first candidate parameter value and store the interface data within the storage unit, the generated interface data associating the first candidate parameter value with a corresponding interface element of a first digital interface; and
generate and transmit, via the communications unit, a second signal to the device, the second signal comprising linking data associated with the stored interface data, and the second signal comprising information that causes an application program executed by the device to present a representation of the linking data within a second digital interface.

2. The apparatus of claim 1, wherein the at least one processor is further configured to determine the first candidate parameter value based on an application of a statistical process, a machine learning process, or an artificial intelligence process to at least one of a portion of the messaging information or a portion of the information characterizing the prior data exchanges.

3. The apparatus of claim 1, wherein the at least one processor is further configured to establish a communications session with the application program executed by the device, the messaging information being generated by the executed application program during the established communications session.

4. The apparatus of claim 3, wherein the at least one processor is further configured to:
load, from the storage unit, profile information associated with the device and session information identifying additional elements of messaging data exchanged between the device and the apparatus during one or more prior communications sessions; and
determine the first candidate parameter value based on a portion of the messaging information and portions of the profile information, the information characterizing the prior data exchanges, and the session information.

5. The apparatus of claim 4, wherein the at least one processor is further configured to determine the first candidate parameter value based on an application of a statistical process, a machine learning process, or an artificial intelligence process to at least one of the portion of the messaging information or the portions of the profile information, the information characterizing the prior data exchanges, and the session information.

6. The apparatus of claim 1, wherein the at least one processor is further configured to:
determine a candidate parameter value for one or more second parameters of the data exchange based on the messaging information and on the information characterizing the prior data exchanges; and
generate the interface data based on the first and second candidate parameter values, the generated interface data associating each of the first and second candidate parameter values with a corresponding one of the interface elements of the first digital interface.

7. The apparatus of claim 1, wherein:
the linking data characterizes a deep link to the stored interface data;
the information further causes the application program executed by the device to present a representation of the deep link within the second digital interface; and
the at least one processor is further configured to receive a third signal from the device via the communications unit, the third signal comprising a first request for the stored interface data associated with the deep link, the first request comprising a portion of the linking data.

8. The apparatus of claim 7, wherein the executed application program generates the first request in response to a receipt of input data indicative of a selection of the presented representation of the deep link by a user of the device.

9. The apparatus of claim 7, wherein the at least one processor is further configured to:
based on the portion of the linking data, load the stored interface data from the storage unit; and
generate and transmit, via the communications unit, a fourth signal that includes the stored interface data to the device, the fourth signal comprising additional information that causes the executed application program to present the first digital interface in accordance with the stored interface data and populate the corresponding interface element of the first digital interface with the first candidate parameter value.

10. The apparatus of claim 9, wherein the at least one processor is further configured to:
receive a fifth signal from the device via the communications unit, the fifth signal comprising a second request to initiate the data exchange in accordance with the first candidate parameter value, the second request being generated by the executed application program; and
based on the second request, perform operations that initiate the data exchange in accordance with at least the first candidate parameter value.

11. The apparatus of claim 1, wherein the at least one processor is further configured to identify one or more discrete linguistic elements within the messaging data based on an application of a statistical process, a machine learning process, or an artificial intelligence process to portions of the messaging data.

12. The apparatus of claim 11, wherein the at least one processor is further configured to:
determine that the one or more discrete linguistic elements establish an incomplete portion of first candidate parameter value; and
determine the first candidate parameter value based on the incomplete portion and the information characterizing the prior data exchanges.

13. The apparatus of claim 11, wherein the at least one processor is further configured to:
determine that the one or more discrete linguistic elements establish a candidate parameter value of a second parameter of the data exchange; and
generate the interface data based on the first and second candidate parameter values, the generated interface data associating each of the first and second candidate parameter value with a corresponding one of the interface elements of the first digital interface.

14. A computer-implemented method, comprising:
receiving, using at least one processor, a first signal from a device that includes messaging information;
determining, using the at least one processor, a candidate parameter value for a first parameter of an exchange of data based on the messaging information and information characterizing prior exchanges of data between the device and a computing system;
using the at least one processor, generating interface data based on the first candidate parameter value and storing the interface data within a storage unit, the generated interface data associating the first candidate parameter value with a corresponding interface element of a first digital interface; and
generating and transmitting, using the at least one processor, a second signal to the device, the second signal comprising linking data associated with the stored interface data, and the second signal comprising information that causes an application program executed by the device to present a representation of the linking data within a second digital interface.

15. The computer-implemented method of claim 14, further comprising determining the first candidate parameter value based on an application of a statistical process, a machine learning process, or an artificial intelligence process to at least one of a portion of the messaging information or a portion of the information characterizing the prior data exchanges.

16. The computer-implemented method of claim 14, further comprising:
establishing a communications session with the application program executed by the device, the messaging information being generated by the executed application program during the established communications session;
loading, from the storage unit, profile information associated with the device and session information identifying additional elements of messaging data exchanged with the device during one or more prior communications sessions; and
determining the first candidate parameter value based on an application of a statistical process, a machine learning process, or an artificial intelligence process to at least one of a portion of the messaging information or to portions of the profile information, the information characterizing the prior data exchanges, and the session information.

17. A device, comprising:
a communications unit;
a display unit;
a storage unit storing instructions; and
at least one processor coupled to the communications unit, the display unit, and the storage unit, the at least one processor being configured to execute the instructions to:
initiate a communications session with an application program executed by a computing system;
generate and transmit a first signal to the computing system via the communications unit, the first signal comprising messaging information generated during the communications session, the messaging information being associated with an exchange of data;
receive a second signal from the computing system via the communications unit, the second signal comprising linking data associated with interface data maintained by the computing system, the interface data associating a first candidate parameter value of the data exchange with a corresponding interface element of a first digital interface; and
generate and present, via the display unit, a second digital interface that includes a representation of the linking data.

18. The device of claim 17, further comprising an input unit coupled to the processor, wherein the at least one processor is further configured to:
receive, via the input unit, first input data indicative of a selection of the representation of the linking data;
based on the first input data, generate and transmit, via the communications unit, a third signal that includes a portion of the linking data to the computing system.

19. The device of claim 18, wherein the at least one processor is further configured to:
receive a fourth signal from the computing system via the communications unit, the fourth signal comprising the interface data associated with the linking data;
generate and present, via the display unit, the first digital interface in accordance with the interface data; and
performing operations that, via the display unit, modify the presented first digital interface and populate the corresponding interface element with the first candidate parameter value.

20. The device of claim 19, wherein the at least one processor is further configured to:
receive, via the input unit, second input data indicative of a request to initiate the data exchange in accordance with the first candidate parameter value;
generate data characterizing the requested initiation of the data exchange, the request data comprising the first candidate parameter value; and
generate and transmit, via the communications unit, a fifth signal to the computing system that includes the request data, the request data causing the application program executed by the computing system to initiate the data exchange in accordance with the first candidate parameter value.

* * * * *